(12) United States Patent
Ahadian et al.

(10) Patent No.: US 11,533,106 B2
(45) Date of Patent: *Dec. 20, 2022

(54) AUTOMATED SYSTEM FOR LINK HEALTH ASSESSMENT IN FIBER OPTIC NETWORKS

(71) Applicant: ULTRA COMMUNICATIONS, INC., Vista, CA (US)

(72) Inventors: Joseph F. Ahadian, San Marcos, CA (US); Vahid Nazer, San Marcos, CA (US); Sandra Skendzic, Vista, CA (US); Charles B. Kuznia, Encinitas, CA (US); Richard J. Weiss, San Diego, CA (US)

(73) Assignee: ULTRA COMMUNICATIONS, INC., Vista, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/663,652

(22) Filed: May 16, 2022

(65) Prior Publication Data

US 2022/0278746 A1 Sep. 1, 2022

Related U.S. Application Data

(63) Continuation of application No. 17/322,743, filed on May 17, 2021, now Pat. No. 11,368,214, which is a continuation of application No. 16/802,409, filed on Feb. 26, 2020, now Pat. No. 11,018,761.

(60) Provisional application No. 62/841,661, filed on May 1, 2019.

(51) Int. Cl.
*H04B 10/071* (2013.01)
*H04B 10/079* (2013.01)

(52) U.S. Cl.
CPC ....... *H04B 10/071* (2013.01); *H04B 10/0793* (2013.01); *H04B 10/07955* (2013.01); *H04B 10/07957* (2013.01)

(58) Field of Classification Search
CPC .............................. H04B 10/071; H04B 10/85
See application file for complete search history.

(56) References Cited

U.S. PATENT DOCUMENTS

| | | | | |
|---|---|---|---|---|
| 4,217,488 A * | 8/1980 | Hubbard | ................ | H04B 10/85 398/189 |
| 2015/0333822 A1* | 11/2015 | Murphy | .............. | H04J 14/0287 398/28 |
| 2017/0254679 A1* | 9/2017 | Murphy | ................ | G08B 29/06 |

* cited by examiner

*Primary Examiner* — Shi K Li
(74) *Attorney, Agent, or Firm* — Steinfl + Bruno LLP

(57) ABSTRACT

Methods and systems for automated health assessment of fiber optic links of a fiber optic communication system are described. Tables are used to describe the fiber optic links, including access addresses to communication modules used in the links. Telemetry data representative of operation of the communication modules can be read via the access addresses into a central station. OTDR/OFDR measurement data of fiber optic segments used in the links can be read via the access addresses into the central station. The telemetry and/or OTDR/OFDR measurement data can be used by the central station for comparison against reference data to assess health of the links. The communication modules locally and continuously capture the telemetry data to detect transient events that may be the result of tampering of the links.

28 Claims, 25 Drawing Sheets

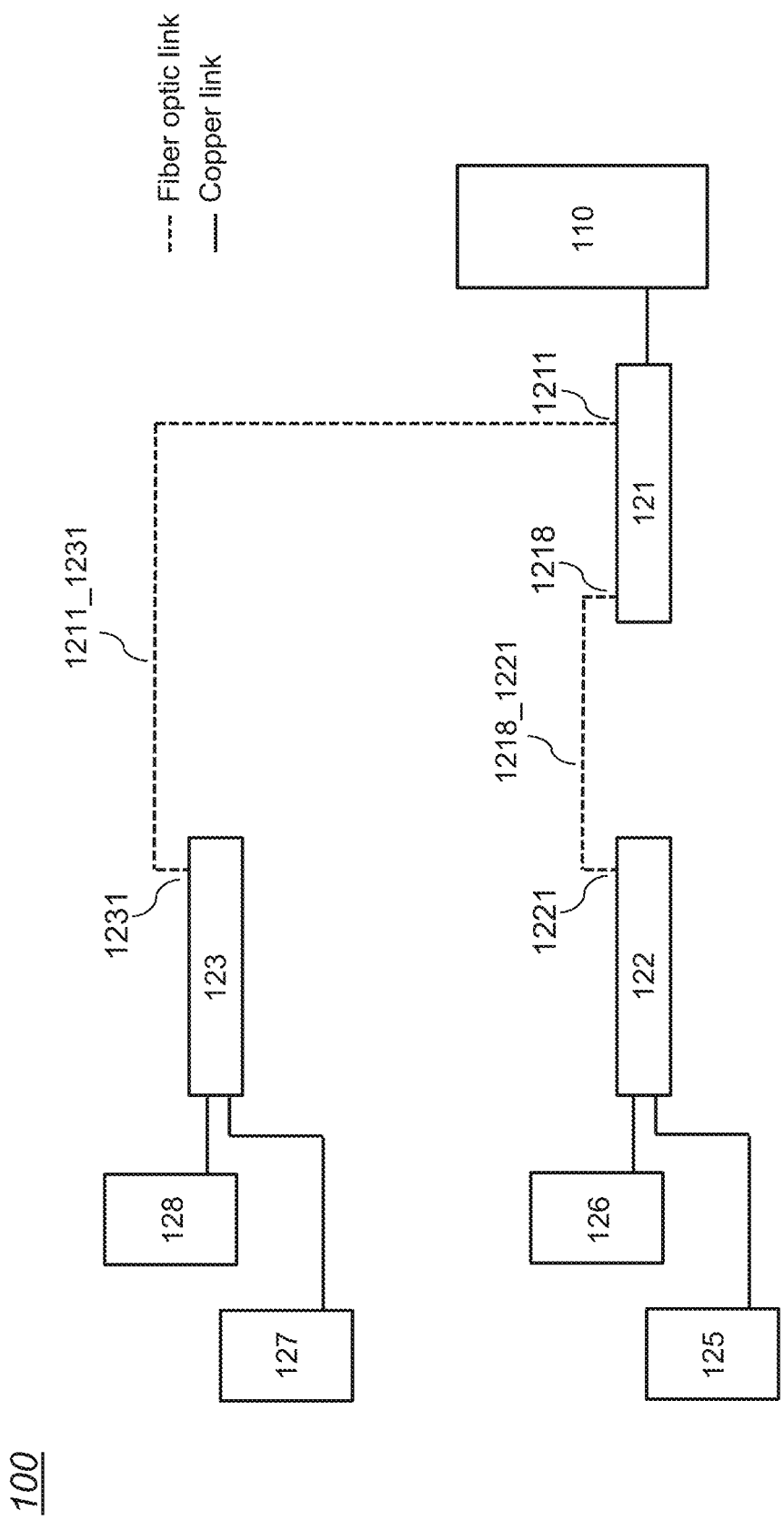

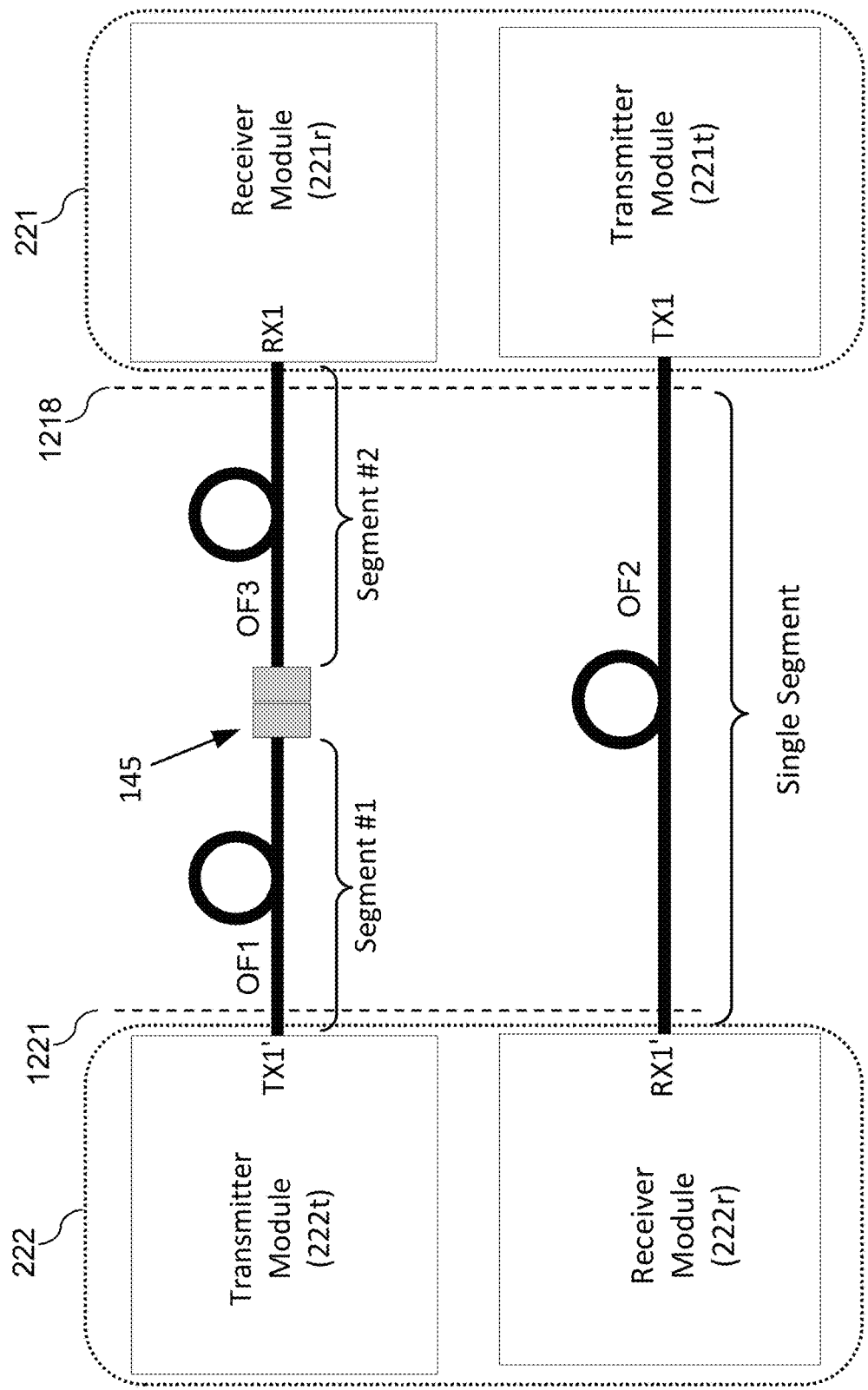
FIG. 1D *Prior Art*

300

| MCU Temp (C) | 21.1 |
| Die Temp (C) | 39.1 |
| Vdd Min (V) | 3.221 |
| Vdd Max (V) | 3.269 |

Receiver Power
| Ch1 (mW) | 0.088 |
| Ch2 (mW) | 0.090 |
| Ch3 (mW) | 0.157 |
| Ch4 (mW) | 0.078 |

Transmitter Power
| Ch1 (mW) | 0.591 |
| Ch2 (mW) | 0.727 |
| Ch3 (mW) | 0.707 |
| Ch4 (mW) | 1.093 |

LD Voltage
| Ch1 (V) | 1.939 |
| Ch2 (V) | 1.950 |
| Ch3 (V) | 1.938 |
| Ch4 (V) | 1.941 |

FIG. 3

AUTOMATED SYSTEM FOR LINK HEALTH ASSESSMENT IN FIBER OPTIC NETWORKS

CROSS REFERENCE TO RELATED APPLICATIONS

The present application is a continuation of U.S. patent application Ser. No. 17/322,743, filed on May 17, 2021, which, in turn, is a continuation of U.S. patent application Ser. No. 16/802,409, filed on Feb. 26, 2020, now U.S. Pat. No. 11,018,761 issued on May 25, 2021, which claims priority to U.S. provisional application No. 62/841,661, filed on May 1, 2019, all of which are herein incorporated by reference in their entirety.

The present application may be related to U.S. Pat. No. 8,854,609, entitled "Integrated Optical Time Domain Reflectometer", issued Oct. 7, 2014, the disclosure of which is incorporated herein by reference in its entirety. The present application may also be related to U.S. Pat. No. 9,964,464, entitled "Optical Time Domain Reflectometer with High Resolution and High Sensitivity", issued May 8, 2018, the disclosure of which is incorporated herein by reference in its entirety.

GOVERNMENT SUPPORT

This invention was made with government support under grant FA8750-16-C-0258 awarded by the US Air Force. The US government has certain rights in the invention.

TECHNICAL FIELD

The present teachings relate to the field of communication systems and networks that use fiber optic links. More particularly, the present teachings relate to methods and systems for automated health assessment of the fiber optic links used in such communication systems and networks.

BACKGROUND

Fiber optics offer high data rate and electromagnetic interference immunity for data communication systems. While fiber optics were originally utilized for long distance links, fiber optics are now becoming prevalent in applications with short distance links, for example within data centers and fiber-to-the-home (FTTH) networks wherein high running duty cycles, high data integrity, and secure data are prerequisites. In addition, fiber optics may be used in applications that may operate in harsh environments, such as, for example, in communication systems and networks used in aircrafts, helicopters, unmanned vehicles, shipboards, space-crafts and missiles, wherein the fiber optic links may be subjected to severe shock, vibration, exposure to liquid contaminates, and wide temperature ranges (such a $-55$ C to $125$ C).

Such operating requirements may in turn cause stress and damage to hardware components of the communication systems, including to the fiber optic links, and accordingly necessitate maintenance and troubleshooting. However, the available diagnostic and analysis tools for troubleshooting of faults in the fiber optic links are often expensive, physically large and heavy, require system downtime and skilled operators/analysts, making their usage for efficient link analysis and fault diagnosis impractical. Furthermore, there are no tools available today that may allow detection of tampering and/or changes to the fiber optic links that may be necessary to guarantee link performance and data security of the communication system.

It follows that there is a need for an automated system for health assessment of fiber optic links of a communication system to address the above shortcomings. The present teachings disclose such automated system. In particular, any intelligence required for the network health assessment according to the present disclosure is captured as part of the network design and/or construction and subsequently used by function blocks of an automated system, thereby alleviating the need for a trained analyst.

SUMMARY

According to a first aspect of the present disclosure, an automated system for link health assessment (ASLHA) of a fiber optic network comprising a plurality of fiber optic links is presented, the ASLHA comprising: a) a computer-based station for communication with communication modules that participate in fiber optic links of the fiber optic network, each fiber optic link at least comprising: a-i) a transmitter at a transmit side of the fiber optic link, and a-ii) one or more optical fiber segments coupled between said transmit side and a receive side of the fiber optic link; and b) an optical time domain reflectometer (OTDR) in communication with the computer-based station, the OTDR coupled to the one or more optical fiber segments at the transmit side of the fiber optic link, wherein the computer-based station is configured to: access a database to obtain: access address for communication of the computer-based station to the transmitter and the OTDR, linking information of the transmitter and the OTDR to the fiber optic link based on the access address, and reference data representative of a known healthy configuration of the fiber optic link, communicate with the OTDR to read health information of the fiber optic link, the health information comprising OTDR measurement data representative of reflected light signal from the one or more optical fiber segments detected at the transmit side of the fiber optic link, and assess health of the fiber optic link by comparing the OTDR measurement data to reference data representative of a known healthy configuration of the fiber optic link.

According to a second aspect of the present disclosure, a fiber optic network with automated system for link health assessment (ASLHA) is presented, the fiber optic network comprising: a) a plurality of fiber optic links, each fiber optic link at least comprising: a-i) a transmitter at a transmit side of the fiber optic link, and a-ii) one or more optical fiber segments coupled between said transmit side and receive side of the fiber optic link; b) an optical time domain reflectometer (OTDR) coupled to the one or more optical fiber segments at the transmit side of the fiber optic link; c) a computer-based station in communication with the transmitter and the OTDR; and d) a database accessible to the computer-based station, wherein the database comprises: d-i) access address for communication of the computer-based station to the transmitter and the OTDR; d-ii) linking information of the transmitter and the OTDR to the fiber optic link based on the access address; and d-iii) reference data representative of a known healthy configuration of the fiber optic link, wherein the computer-based station is configured to: access the database to obtain the access address and the linking information of the fiber optic link, communicate with the transmitter and the OTDR to read health information of the fiber optic link, the health information comprising telemetry data representative of internal and external operating conditions of said transmitter, and OTDR measurement data representative of reflected light signal from the one or more optical fiber segments detected at the transmit side of the fiber optic link, and assess health of the fiber optic link by comparing the telemetry data and the OTDR measurement data to the reference data.

According to a third aspect, a method for automated link health assessment of a fiber optic network is presented, the method comprising: providing a fiber optic link of the fiber optic network, the fiber optic link comprising a transmitter at a transmit side of the fiber optic link and one or more optical fiber segments coupled between said transmit side and a receive side of the fiber optic link; coupling an optical time domain reflectometer (OTDR) to the one or more optical fiber segments at the transmit side of the fiber optic link; generating linking information of the transmitter and the OTDR to the fiber optic link based on respective communication access address of the transmitter and the OTDR; based on the linking information, communicating with the OTDR to read health information of the fiber optic link, the health information comprising OTDR measurement data representative of reflected light signal from the one or more optical fiber segments detected at the transmit side of the fiber optic link, and assessing health of the fiber optic link by comparing the OTDR measurement data to reference data comprising predetermined limits for the OTDR measurement data.

According to a fourth aspect, an automated system for link health assessment (ASLHA) of a fiber optic network comprising a plurality of fiber optic links is presented, the automated system comprising: a) a computer-based station for communication with communication modules that participate in fiber optic links of the fiber optic network, each fiber optic link at least comprising: a-i) a transmitter at a transmit side of the fiber optic link, and a-ii) one or more optical fiber segments coupled between said transmit side and a receive side of the fiber optic link; and wherein the computer-based station is configured to: access the database to obtain: access address for communication of the computer-based station to the transmitter, and linking information of the transmitter to the fiber optic link based on the access address, and communicate with the transmitter to read health information of the fiber optic link, the health information comprising telemetry data representative of internal and external operating conditions of said transmitter, and light measurement data representative of reflected light signal from the one or more optical fiber segments detected at the transmit side of the fiber optic link, and assess health of the fiber optic link by comparing the telemetry data and the light measurement data to the reference data.

According to a fifth aspect, an automated system for link health assessment (ASLHA) of a fiber optic network comprising a plurality of fiber optic links is presented, the ASLHA comprising: a) a computer-based station for communication with communication modules that participate in fiber optic links of the fiber optic network, each fiber optic link at least comprising: one or more optical fiber segments coupled between a transmit side and a receive side of the fiber optic link; and b) an optical time domain reflectometer (OTDR) in communication with the computer-based station, the OTDR coupled to the one or more optical fiber segments at the transmit side of the fiber optic link, wherein the computer-based station is configured to: access a database to obtain: access address for communication of the computer-based station to the OTDR, linking information of the OTDR to the fiber optic link based on the access address, and reference data representative of a known healthy configuration of the fiber optic link, communicate with the OTDR to read health information of the fiber optic link, the health information comprising OTDR measurement data representative of reflected light signal from the one or more optical fiber segments detected at the transmit side of the fiber optic link, and assess health of the fiber optic link by comparing the OTDR measurement data to reference data representative of a known healthy configuration of the fiber optic link.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

FIG. 1A shows an exemplary block diagram of a fiber optic network wherein optical fibers form fiber optic links between ports of the network.

FIG. 1D shows two fiber optic links between two ports of the fiber optic network of FIG. 1A, wherein the fiber optic links are each formed by one or more optical fiber segments connected to communication modules.

FIG. 3 shows a table representing exemplary telemetry data read from the connection to the network component of FIG. 2A or FIG. 2B.

DETAILED DESCRIPTION

Figure 1B:
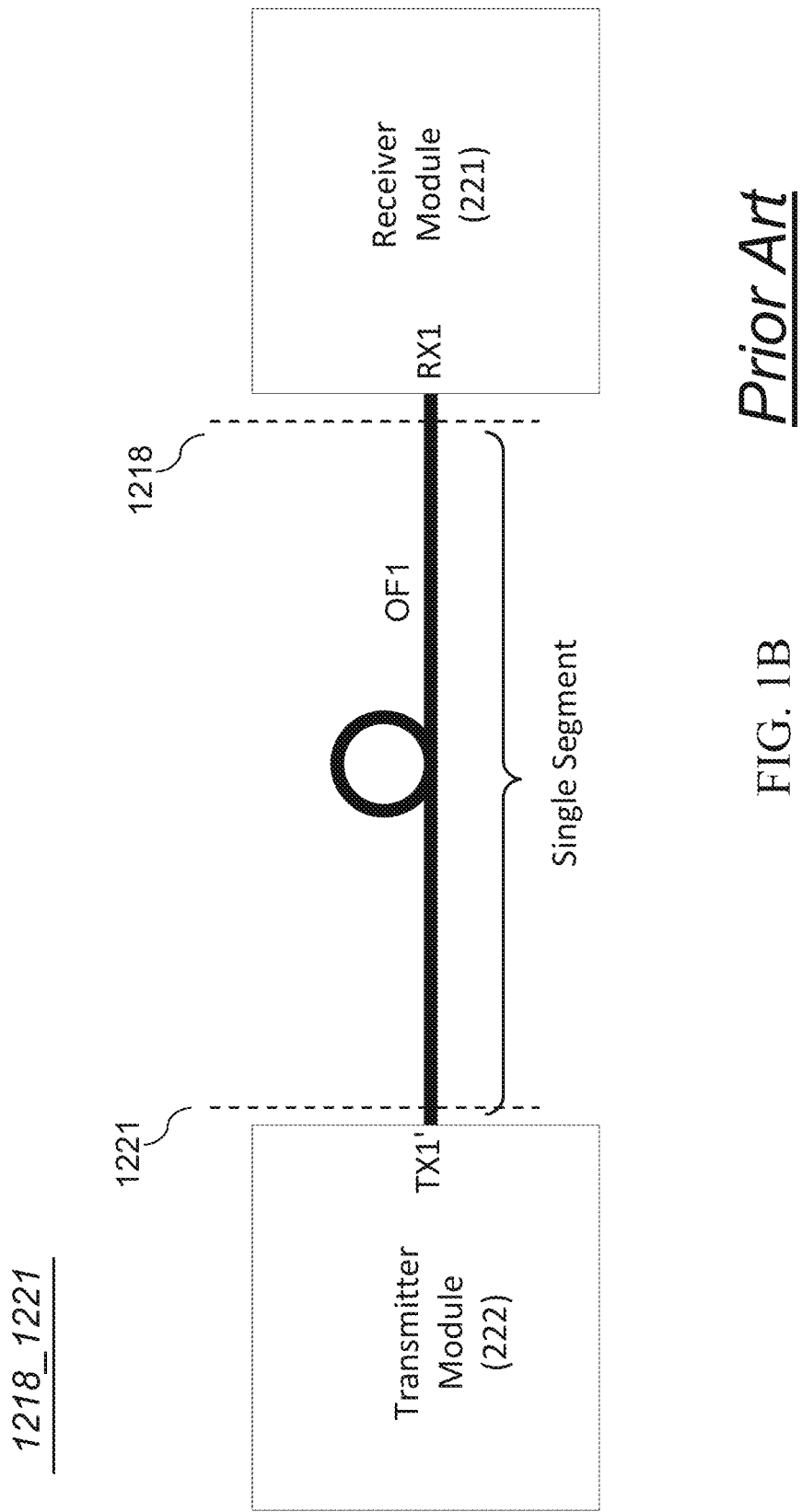
FIG. 1B shows a fiber optic link between two ports of the fiber optic network of FIG. 1A, wherein the fiber optic link comprises a transmit path formed by a single optical fiber segment connected to a transmitter module at a transmit port of the two ports.

Throughout this description, embodiments and variations are described for the purpose of illustrating uses and implementations of the inventive concept. The illustrative description should be understood as presenting examples of the inventive concept, rather than as limiting the scope of the concept as disclosed herein.

The present disclosure describes an automated system for link health assessment (ASLHA) in fiber optic networks. For the sake of description of the various embodiments of the present disclosure, an exemplary network configuration as depicted in FIG. 1A is considered. A person skilled in the art would clearly understand that the teachings according to the present disclosure are not limited to such exemplary configuration.

With reference to FIG. 1A, an exemplary block diagram of a fiber optic network (100) is shown, wherein optical fibers, shown in dotted lines, form fiber optic links between ports of the network (100). In the exemplary configuration depicted in FIG. 1A, a plurality of links connect ports of network components (110, 121, 122, 123, 125, 126, 127, 128), wherein, for example, component (110) may be a server, components (121, 122, 123) may be routers or switches, and components (125, 126, 127, 128) may be workstations. As can be seen in FIG. 1A, components (121, 122, 123) may communicate via interconnecting fiber optic links connected to respective ports of such components. For example, port (1218) of network component (121) is linked to port (1221) of network component (122) via a fiber optic link (1218_1221). Similarly, port (1211) of network component (121) is linked to port (1231) of network component (123) via a fiber optic link (1211_1231). As used herein, the term "port" may refer to a physical port of a network component (e.g., 121, 122, 123, etc.), used to physically connect an optical fiber and thereby forming a fiber optic link. A person skilled in the art would know of many different types and configurations of such port, description of which is beyond the scope of the present disclosure. As it well known in the art, such port may be externally accessible to facilitate quick connection/disconnection of the optical fiber or may be an internal port that may not be easily/readily accessible.

As it is well known in the art, each network component (e.g., 121, 122, 123) can include one or more ports, each such port capable of transmitting, receiving, or transmitting and receiving (bidirectional) data over the fiber optic links. As is well known to a person skilled in the art, such ports may each include a communication module, such as a transmitter (module), a receiver (module), or a transmitter and receiver (module), for communication over a fiber optic link. Some exemplary port configurations are shown in FIG. 1B, FIG. 1C, FIG. 1D and FIG. 1E.

FIG. 1B shows some details of one possible configuration of a fiber optic link between ports of the network (100), exemplified by the fiber optic link (1218_1221) between port (1218) of network component (121) and port (1221) of network component (122). As can be seen in the configuration of FIG. 1B, the port (1218) is configured to receive data over the fiber optic link (1218_1221) via a receiver RX1 (i.e., receiver module 221) and the port (1221) is configured to transmit data over the fiber optic link (1218_1221) via a transmitter TX1' (i.e., transmitter module 222). In the exemplary configuration shown in FIG. 1B, a link between the two ports is provided by a single optical fiber OF1 (e.g., single strand) that is coupled, at respective ends of the optical fiber OF1, to the receiver RX1 (221) and the transmitter TX1' (222). Accordingly, the optical fiber OF1 shown in FIG. 1B may form a single segment, or in other words, there may be no discontinuity in the optical fiber that forms a link between ports (1218) and (1221). A discontinuity, as defined in the present disclosure, may comprise any aspect of a fiber optic link that is not a single piece of uninterrupted optical fiber presenting a homogeneous light transmission property (optical signal path). Examples of discontinuities may be connectors, couplers, breaks, and inconsistencies in the optical fiber, such as, for example, slices and fusions. Discontinuities in the optical fiber may cause a unique signature based on measured light reflection. However, a given component in two different fiber optic links may not always have a same signature. Some discontinuities may be represented by peaks in (light) power, while others may be represented by dips. Discontinuities may also block light, transmit light, or do a combination of both, further complicating the analysis of discontinuities.

Figure 1C:
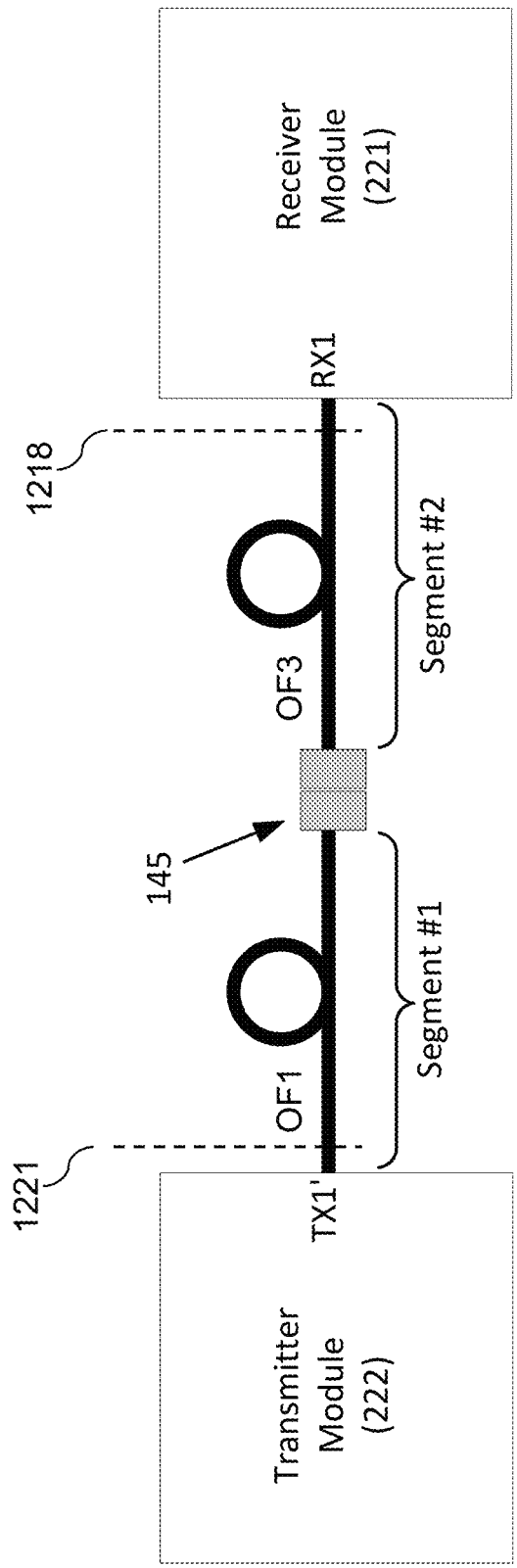
FIG. 1C shows another fiber optic link between two ports of the fiber optic network of FIG. 1A, wherein the fiber optic link comprises a transmit path formed by at least two optical fiber segments connected to a transmitter module at a transmit port of the two ports.

FIG. 1C shows another exemplary configuration of the fiber optic link (1218_1221), similar to the configuration described above with reference to FIG. 1B, wherein a link between the two ports (1218) and (1221) may include a discontinuity provided by two optical fibers (OF1, OF3). A person skilled in the art is well aware that such discontinuity may be in the form of connectors and/or couplers used, for example, to physically lengthen an optical signal path of a fiber optic link between two ports as shown in FIG. 1C. In the exemplary fiber optic link shown in FIG. 1C, the transmitter TX1' (222) of port (1221) may transmit data to the receiver RX1 (221) of port (1218) via a first (single strand) optical fiber, OF1, that is coupled, via a connector (145), to a second (single strand) optical fiber, OF3. It should be noted that although the exemplary connector (145) is shown as a means to lengthen an optical signal path of the fiber optic link between ports (1221, 1218), other types of connectors may be envisioned, such as, for example, T-type connectors, that may allow tapping (e.g., eavesdropping) into the fiber optic link. As will be described later in the present disclosure, any such connector that creates a discontinuity in the optical fibers between respective ports, can affect quality of an optical signal received by the receiver RX1 (221). As will be described later in the present disclosure, the teachings according to the present disclosure can detect and monitor effects of such discontinuity.

FIG. 1D shows another exemplary configuration of the fiber optic link (1218_1221) between the ports (1218) and (1221) of the fiber optic network of FIG. 1A for bidirectional communication. As can be seen in the configuration of FIG. 1D, the port (1218) is configured to receive data over the fiber optic link (1218_1221) via a receiver RX1 (221*r*) and transmit data over the fiber optic link (1218_1221) via a transmitter TX1 (221*r*). Similarly, the port (1221) is configured to transmit data over the fiber optic link (1218_1221) via a transmitter TX1' (222*t*) and receive data over the fiber optic link (1218_1221) via a receiver RX1' (222*r*). Accordingly, each of the ports (1218) and (1221) are configured to transmit and to receive data over the fiber optic link (1218_1221) via respective communication modules (221) and (222). In the exemplary non-limiting configuration of FIG. 1D, the fiber optic link (1218_221) includes two optical fiber segments (OF1, OF3) between the transmitter TX1' (222*t*) and the receiver RX (221*r*), and a single optical fiber segment (OF2) between the transmitter TX1 (221*t*) and the receiver RX' (222*r*).

Figure 1E:
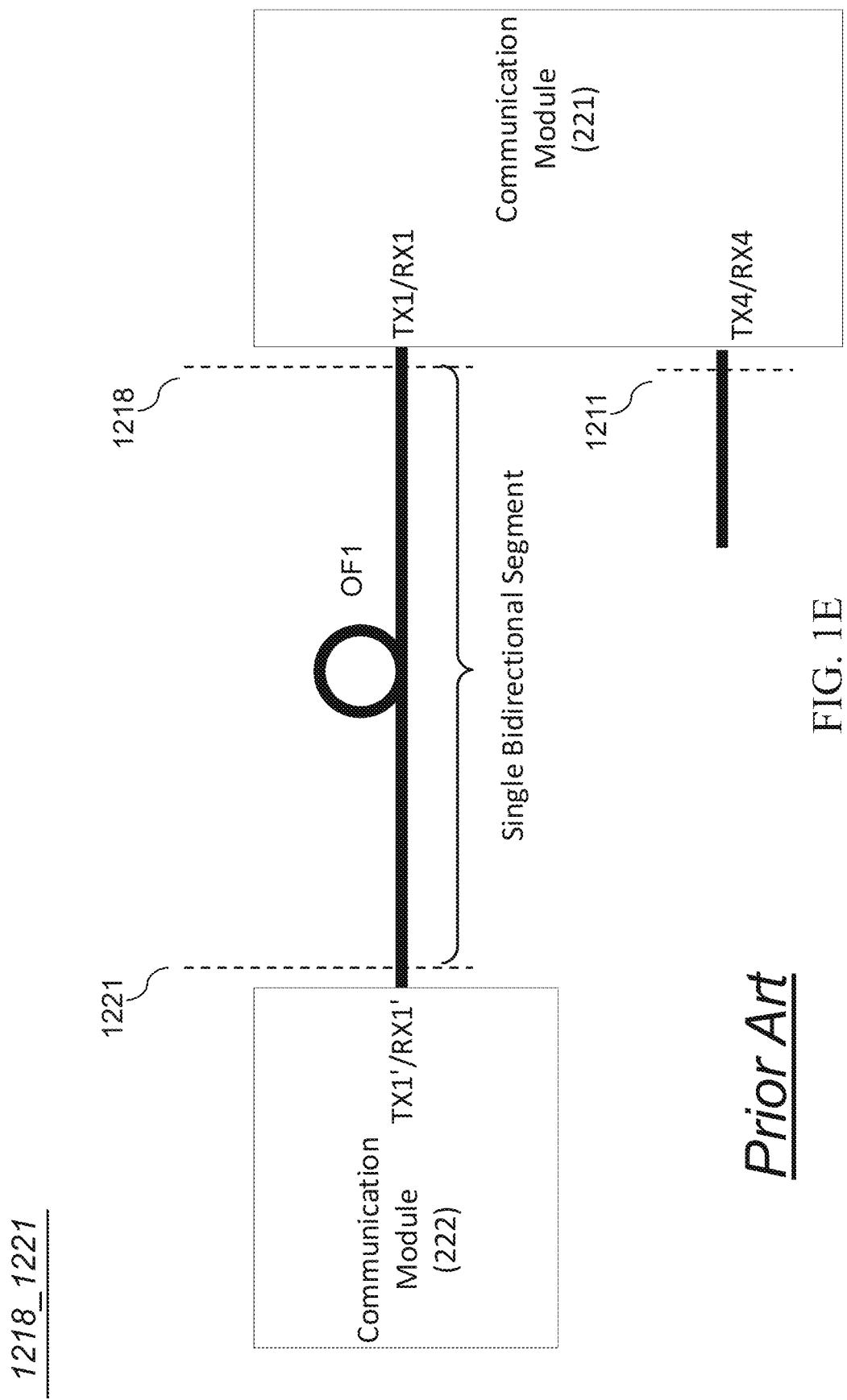
FIG. 1E shows a fiber optic link between two ports of the fiber optic network of FIG. 1A, wherein the fiber optic link comprises a bidirectional transmit and receive path formed by one or more optical fiber segments connected to communication modules at the two ports.

As it is well known in the art, a bidirectional communication module may be provided by separate optical signal paths, such as (OF1, OF3) and OF2 per the configuration shown in FIG. 1D, or can be provided, as shown in FIG. 1E, via a single optical signal path provided by one (or more) optical fiber segment (OF1). As known to a person skilled in the art, bidirectionality of the communication module over a single optical signal path may be provided by, for example, multiplexing of a transmit and a receive signal over the single optical signal path, or by using different optical signal wavelengths for each of the transmit and receive signals that can coexist over the single optical signal path. As will be described later, teachings according to the present disclosure may apply to any fiber optic link, including the bidirectional link shown in FIG. 1E.

As shown in FIG. 1D, the communication module (221) at port (1218) of the network component (121), and the communication module (222) at port (1221) of the network component (122) may each be a single channel communication, or stated in other words, adapted for communication over a single fiber optic link (1218_1221). On the other hand, as shown, for example in FIG. 1E, a communication module (221) that participates in a fiber optic link (e.g., 1218_1221) may be a multichannel (e.g., four channels) communication module for communication over a plurality of fiber optic links (e.g., links 1211_1231 and 1218_1221) of FIG. 1A). As it is well known in the art, a communication module (e.g., 221, 222) translates an electrical signal corresponding to data communicated over a wire link (e.g., copper) to an optical signal corresponding to same data for communication over an optical fiber link.

As it is well known in the art, each port of the fiber optic network (100) can be uniquely identified by a corresponding communication module and/or communication module channel. For example, with reference to the configuration of FIG. 1B where single channel communication modules (221, 222) are used, port (1218) can be uniquely identified by a single receive channel (RX1) of the communication module (221), and port (1221) can be uniquely identified by a single transmit channel (TX1') of the communication module (222). In other words, the status or operating conditions of the fiber optic link (1218_1221) shown in FIG. 1B can be defined by the status or operating conditions of the single receive channel of the communication module (221), the single transmit channel of the communication module (222), as well as condition/connections of the optical fiber OF1. On the other hand, with reference to the configuration of FIG. 1D, the status or operating conditions of the fiber optic link (1218_1221) may be defined by the status or operating conditions of the single receive and transmit channel (RX1, TX1) of the communication module (221), the single receive and transmit channel (RX1', TX1') of the communication module (222), as well as condition/connections of the optical fibers OF1, OF2 and OF3.

According to some embodiments, the communication module (e.g., 221, 222) may include sensors and circuitry to monitor, locally store, and report internal and external operating parameters (telemetry) of the communication module, including, for example, internal voltages, currents and temperatures, and received/transmitted signal levels (e.g., light/power levels) and related qualities for each channel of the communication module (see, e.g., FIG. 3 later described). According to some embodiments of the present disclosure, the communication module (e.g., 221, 222) may include functionality to continuously, or at given pre-programmed time periods, monitor/capture the telemetry data and locally record (by way of, e.g., a local memory) corresponding minimum, maximum, average, and other statistical values/trends for later reporting. As described later in the present disclosure, the automated system for link health assessment (ASLHA) according to the present disclosure may monitor such data to assess health of fiber optic links of the fiber optic network (100) depicted in FIG. 1A. Such health assessment may be in view of pre-recorded (e.g., telemetry) data that may be used as reference (e.g., minimum, maximum, average, etc. values) to subsequently captured data, and/or trends and variations of (e.g., telemetry) data that are continuously captured.

Figure 2A:
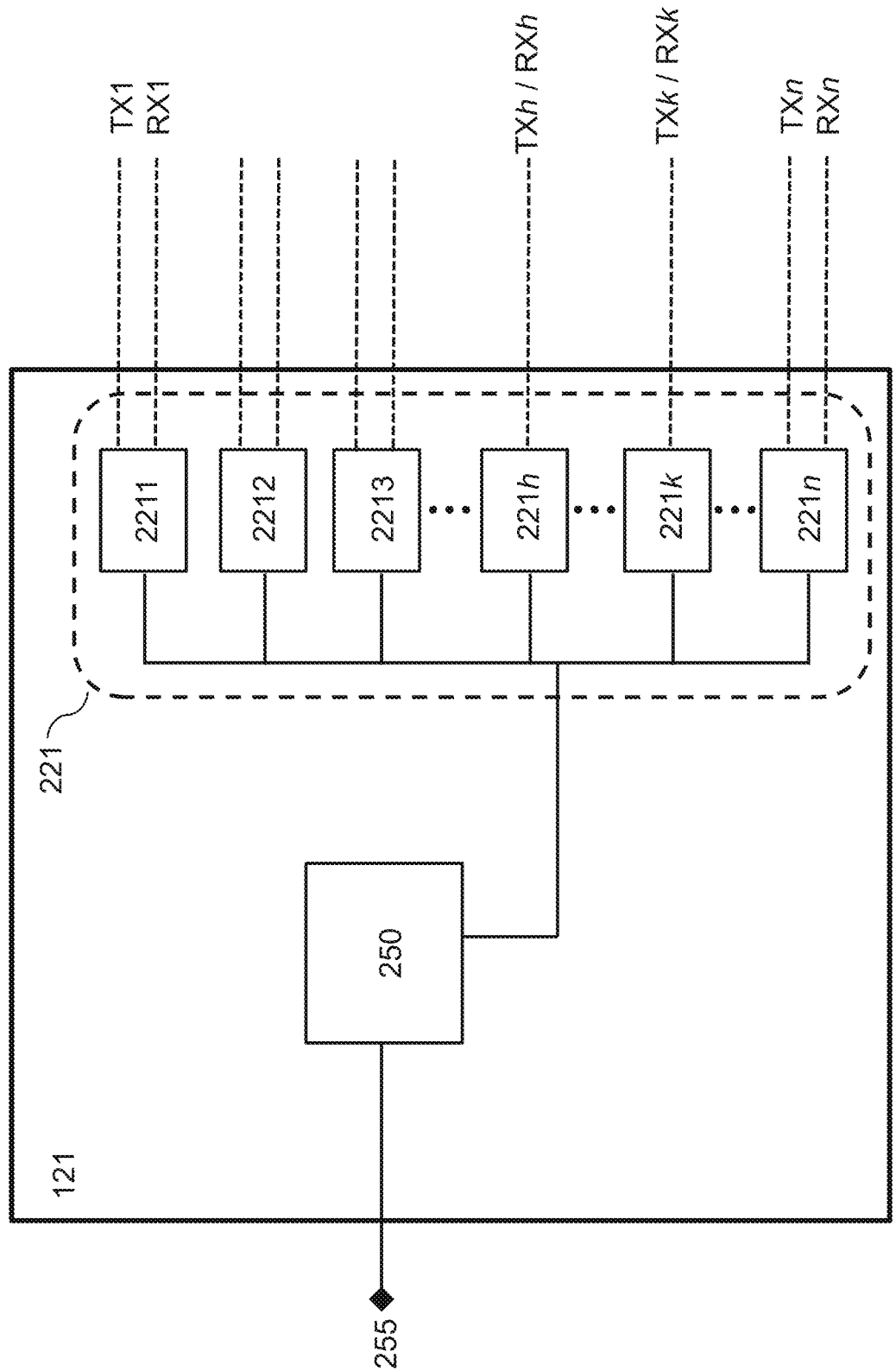
FIG. 2A shows a simplified block diagram of a network component of the fiber optic network of FIG. 1A comprising an embedded communication module, wherein telemetry data from the communication module are available via a connection to the network component.

FIG. 2A shows an exemplary simplified block diagram of the network component (121) of the fiber optic network (100) of FIG. 1A. As shown in FIG. 2A, the network component (121) may include an embedded communication module (221), wherein telemetry data from the communication module (221) may be available via a connection (255) to the network component (121). According to an exemplary embodiment, a controller unit (e.g., microprocessor, microcontroller) (250) of the network component (121) may communicate with the communication module (221) to read the telemetry data from the communication module (221) and make such data available via the connection (255). It should be noted that the connection (255) may be supported by any physical (hardware) and logical (software) data/communication interface and is not limited to any particular physical interface (wiring, connector, etc.) or logical data/communication interface (e.g., data/packet formats). For example, the connection (255) may be an ethernet port, a serial port, a parallel port, or any other standard or proprietary port of the network component (121) that is adapted for data communication, including a port of the fiber optic network (100) defined by any channel of the communication module (221). As shown in the exemplary embodiment of FIG. 2A, the communication module (221) may include one or more separate single channel communication modules (2211, . . . , 221n) each defining a different port of the network component (121). For example, each such single channel communication module (2211, . . . , 221n) may be: a receive or transmit module (e.g., 221h, 221k) for transmitting or receiving data over a single optical signal path (e.g., per FIG. 1B); a bidirectional module (e.g., 2211, 221n) for transmitting and receiving of data over different optical signal paths (e.g., per FIG. 1D); or a bidirectional module (e.g., 221h, 221k) for transmitting and receiving of data over a same optical signal path (e.g., per FIG. 1E).

Figure 2B:
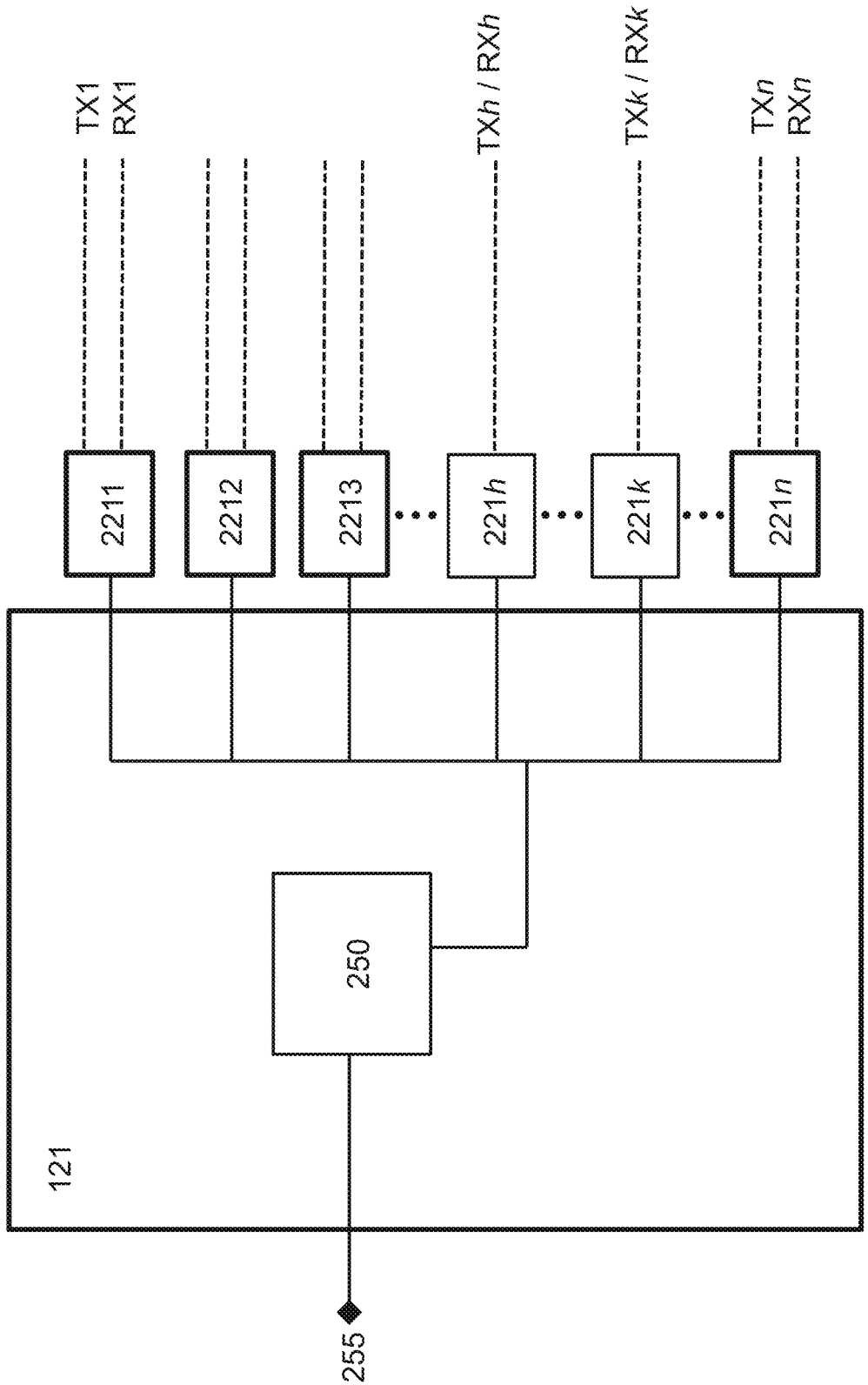
FIG. 2B shows another simplified block diagram of a network component of the fiber optic network of FIG. 1A comprising external plug-in communication modules, wherein telemetry data from the communication modules are available via a connection to the network component.
Figure 2C:
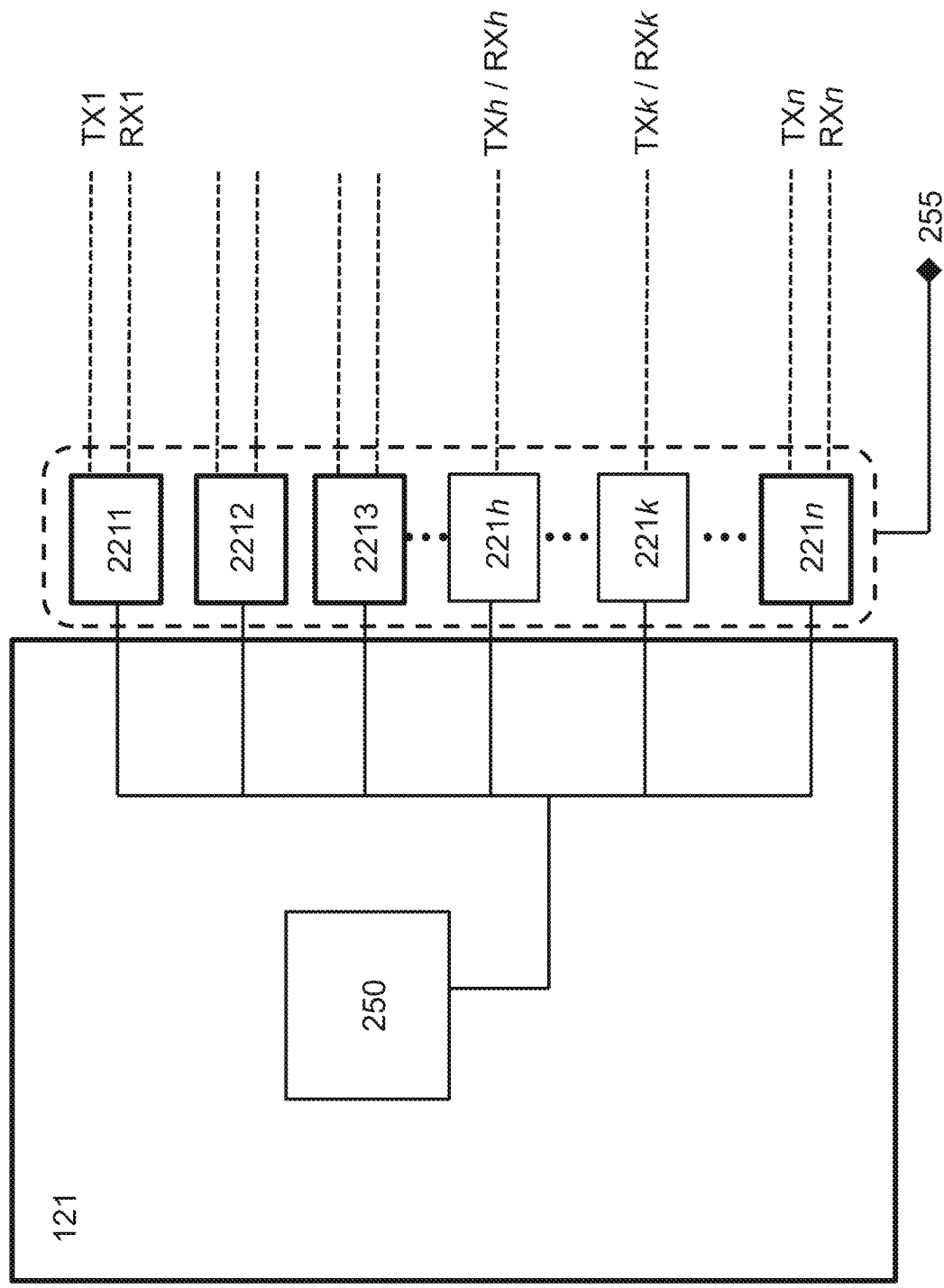
FIG. 2C shows yet another simplified block diagram of a network component of the fiber optic network of FIG. 1A comprising external plug-in communication modules, wherein telemetry data from the communication modules are available via a connection to the network component.

As shown in FIG. 2B, according to some embodiments, the communication module of the network component (121) may not be embedded, but rather may be external to the network component (121). For example, as shown in the exemplary embodiment of FIG. 2B, the communication module may include a plurality of separate single channel (transmit and/or receive) communication modules (2211, . . . , 221n) each defining a different port of the network component (121). For example, each such single channel communication module (2211, . . . , 221n) may be a well-known in the art small form-factor pluggable (SFP) module that plugs to communication ports of the network component (121). According to one exemplary embodiment, when plugged to the network component (121) as shown in FIG. 2B, the controller unit (250) may communicate with each of the single channel communication modules (2211, . . . , 221n) to read the telemetry data from the communication modules (2211, . . . , 221n) and make such data available via the connection (255). Alternatively, or in addition, as shown in FIG. 2C, the connection (255) may directly interface with each of the single channel communication modules (2211, . . . , 221n). A person skilled in the art is well aware that a communication module, such as each of the single channel communication modules (2211, . . . , 221n), may include a controller (e.g., microprocessor, not shown in the figure) that can read and report via, for example, a dedicated interface, telemetry data of the communication module. Furthermore, as described above with reference to FIG. 2A, the connection (255) may be any port of the fiber optic network (100) defined by any of the single channel communication modules (221, . . . , 221n).

FIG. 3 shows a table representing exemplary non-limiting telemetry data read from the connection (255) to the network component (121) described above with reference to FIGS. 2A-2C. As shown in the table of FIG. 3, the telemetry data can include, for example, local temperature of microcontroller (e.g., MCU temp) and die (e.g., Die temp), minimum and maximum values of operating supply voltage (e.g., Vdd Min/Max), receiver power, transmitter power, and internal laser diode voltage (L D voltage) for each of the four channels (e.g., Ch1, . . . , Ch4). A person skilled in the art would clearly understand that additional parameters representative of internal operating conditions of the communication modules may be included in the telemetry data provided via the connection (255).

Figure 4A:
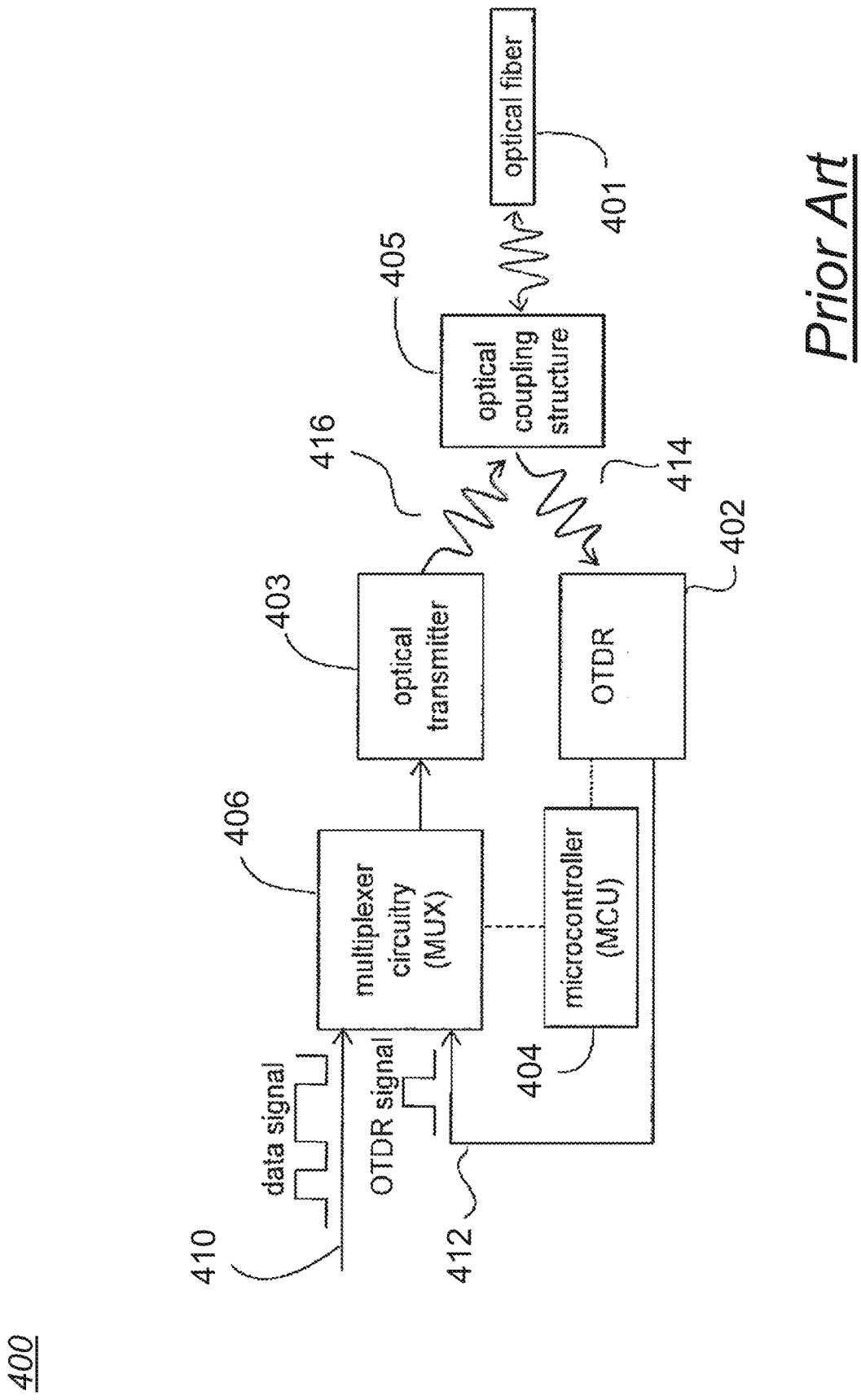
FIG. 4A shows a simplified block diagram of a transmitter module with an integrated optical time domain reflectometer (OTDR) that can be integrated in a chip, such as, for example, an ASIC.

According to an exemplary embodiment of the present disclosure, monitoring of health of the fiber optic link of the fiber optic network (100) of FIG. 1A may include measuring optical signal quality in the optical fibers (e.g., OF1, . . . , OF3 of FIGS. 1B-1D) by way of an optical time domain reflectometer (OTDR). FIG. 4A shows a simplified block diagram of a transmitter module (400) with an integrated OTDR (402) that can be integrated in a chip, such as, for example, an ASIC (application-specific integrated circuit). Such transmitter module (400) may be used as a transmitter module at any port (e.g., 121, 1218, 1221, etc.) of the fiber optic links (e.g., 1218_1221) of the fiber optic network (100).

As can be seen in FIG. 4A, the transmitter module (400) includes a multiplexer circuitry (MUX, 406), and optical transmitter (403), and OTDR (402), a processor or microcontroller (MCU, 404) and an optical coupling structure (405) that is configured to be coupled to an optical fiber (401) uses in a fiber optic link. The microcontroller (404) may control operation of the transmitter module (400) according to a data transmission mode for transmitting of data signal (410) through the optical fiber (401), or according to an OTDR mode for obtaining an OTDR measurement of the optical fiber (401) using an OTDR signal (e.g., pulse signal) transmitted to (and reflected from) the optical fiber (401). OTDR measurement data can be stored in memory (not shown) or otherwise communicated to the outside of the transmitter module via a communications link (e.g., connection 255 of FIGS. 2A-2C).

With continued reference to FIG. 4A, during operation in the data transmission mode, the microcontroller (404) controls the multiplexer (406) to pass the data signal (410) to the optical transmitter (403), the optical transmitter (403) converts the data signal (410) to a light signal (416), and the optical coupling structure (405) couples the light signal (416) into the optical fiber (401). During operation in the OTDR measurement mode, the microcontroller (404) controls the multiplexer (406) to pass the OTDR signal (412) to the optical transmitter (403), the optical transmitter (403) converts the OTDR signal (412) to a light signal (416), and the optical coupling structure (405) couples the light signal (416) into the optical fiber (401).

With continued reference to FIG. 4A, some of the light signal (416) may reflect back from the optical fiber (401) and be directed, by the optical coupling structurer (405), to the OTDR (402) as a reflected light signal (414) for processing. As known to a person skilled in the art, such reflected light signal (414) may be due, for example, to an optical discontinuity or disruption in an optical signal path provided by the optical fiber (401). By measuring a time between the emitted light signal (416) (or corresponding electrical signal 412) and the received (reflected) light signal (414) (or corresponding electrical signal) in the OTDR (402), a position of a discontinuity (disruption) in the optical fiber (401) can be calculated. More description and implementation details of the transmitter module (400) can be found, for example, in the above referenced U.S. Pat. No. 8,854,609, the disclosure of which is incorporated herein by reference in its entirety.

Figure 4B:
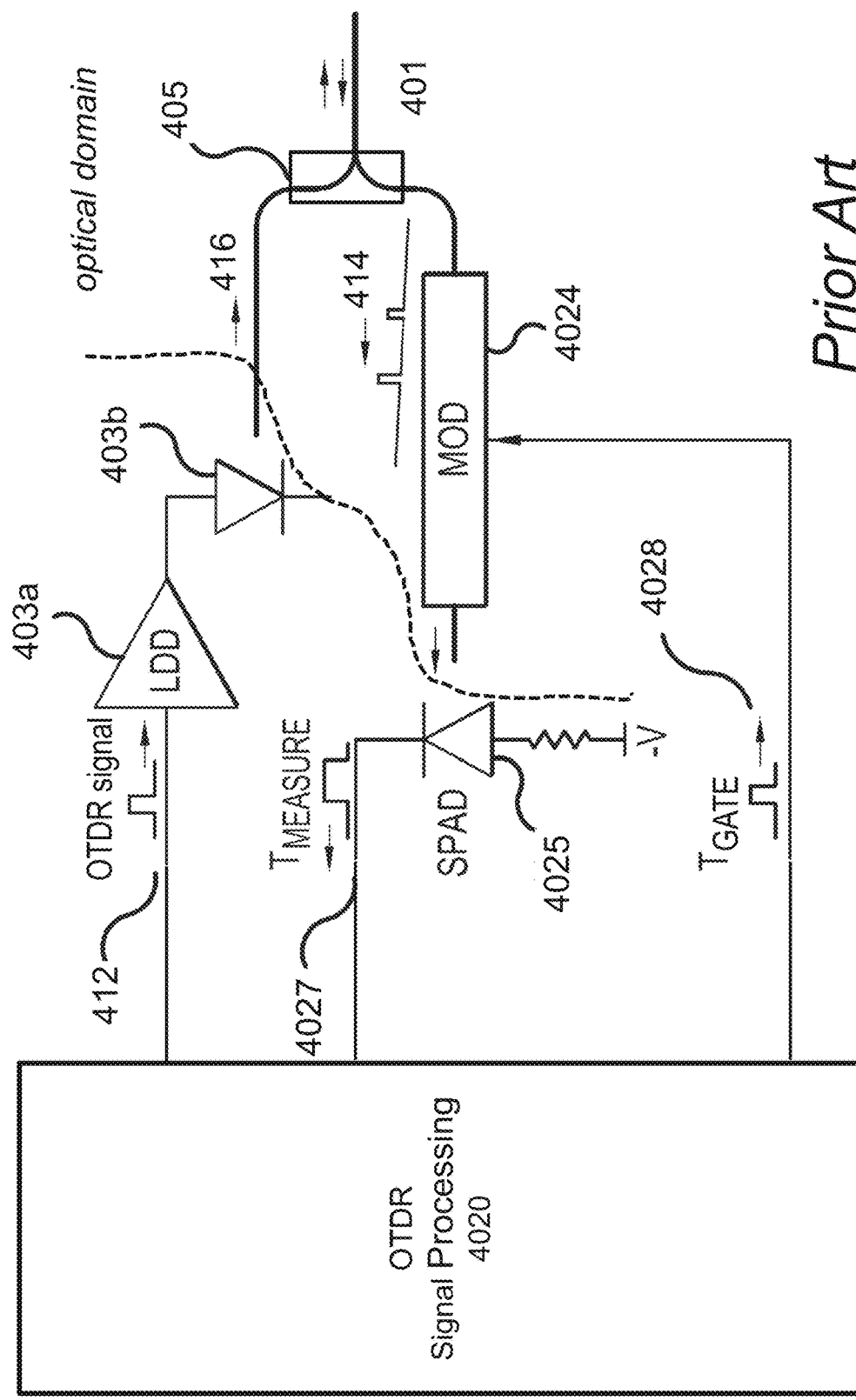
FIG. 4B shows a schematic of another exemplary implementation of an optical time domain reflectometer (OTDR).
Figure 5A:
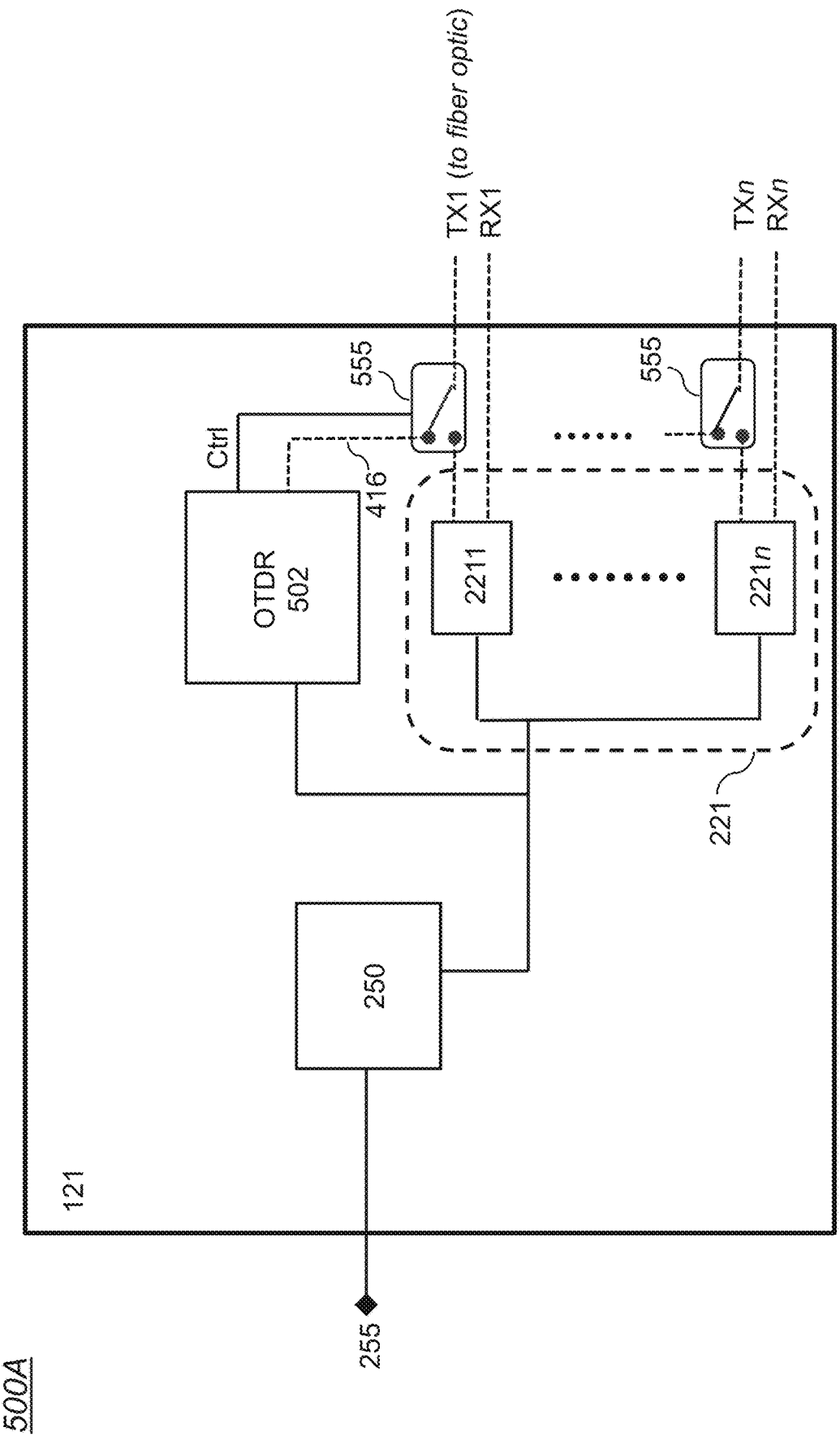
FIG. 5A shows a simplified block diagram according to an alternative embodiment of the present disclosure of a network component of the fiber optic network of FIG. 1A comprising an integrated OTDR.
Figure 5B:
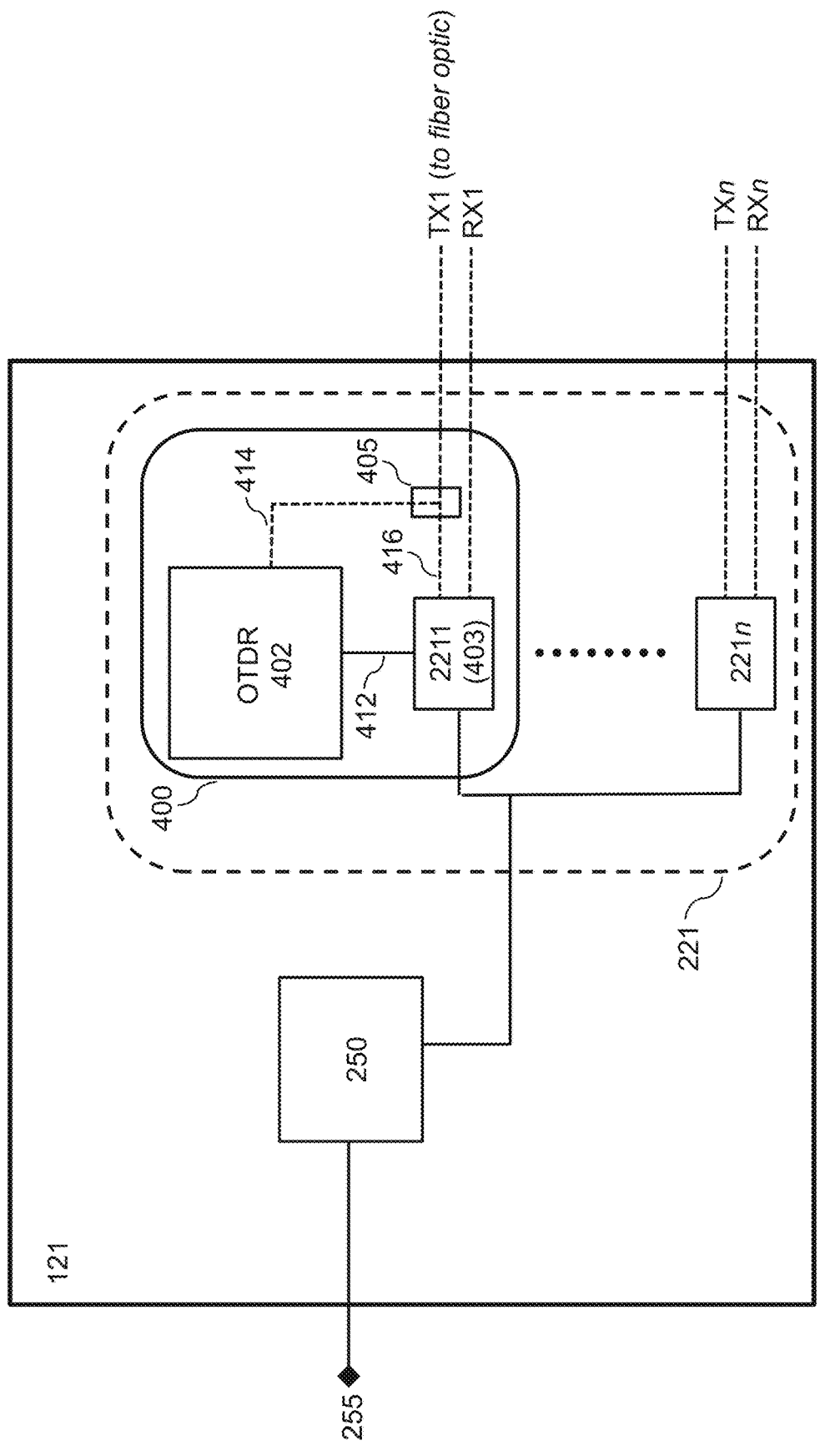
FIG. 5B shows a simplified block diagram according to an embodiment of the present disclosure of a network component of the fiber optic network of FIG. 1A, such as the network component of FIGS. 2A and 2B, comprising the integrated OTDR of FIG. 4A.

FIG. 4B shows a simplified schematic of an exemplary implementation of an OTDR (402B) which can be used, for example, as the OTDR (402) of FIG. 4A. As can be seen in FIG. 4B, the OTDR Signal Processing block (4020) generates a reference electrical OTDR signal (e.g., pulse 412) that is driven by a driver (403a) to excite a light source (403b) and thereby generate a corresponding light OTDR signal (416) that is transmitted through an optical fiber (401), wherein the combination of the driver (403a) and the light source (403b) can be likened to the optical transmitter (403) of FIG. 4A. Reflected light (414), including light pulses, by the optical fiber (401) may be fed to a (high-speed) modulator (4024) that is placed in a path of the reflected light (414) and in front of a photo-sensor (4025). A gating signal (4028) can drive the modulator (4024) so to block out reflected light except during a measuring time defined by a pulse length of the gating signal (4028). Accordingly, a sampled reflected electrical signal (4027) is generated by the photo-sensor (4025) and transmitted to signal processing electronics (4020) of the OTDR for further processing. More information on the exemplary OTDR (402B) can be found, for example, in the above referenced U.S. Pat. No. 9,964,464, the disclosure of which is incorporated herein by reference in its entirety. In particular, as described in such reference, usage of the modulator (4024) to gate the reflected light may be considered advantageous in providing an increase in dynamic range and sensitivity of the OTDR measurement while maintaining relatively high measurement throughputs. Other OTDR implementations which can also be used as an integrated circuit are described in said reference and are fully compatible for integration according to the present teachings. It should be noted that such OTDR may be fully integrated within a transmitter module as described with reference to FIG. 4A and as shown in FIG. 5A later described, or can be selectively coupled to an optical fiber that is part of a fiber optic link by selectively coupling to said fiber either an optical (light) transmit data signal or an optical (light) OTDR signal as shown in FIG. 5B Later described.

It should be noted that a person skilled in the art would know of methods and systems other than the OTDR shown in FIG. 4A and FIG. 4B for measuring characteristics of an optical fiber based on a corresponding reflected light. According to one exemplary implementation, OTDR may be based on a light wavelength that is different from a light wavelength used for data communication in a link of the fiber optic network, and therefore a corresponding OTDR measurement of the link may be performed during data communication through the link. According to another exemplary implementation, OTDR measurement can be based on (back) reflected signal power/light of data (traffic) being communicated through a link in combination with correlation techniques that take into consideration (light) patterns generated by the data traffic. Other well known in the art techniques may include OFDR (optical frequency domain reflectometry) where signal generation and analysis are performed in frequency domain, such as, for example, interferometric technique with a swept laser wavelength or with a swept frequency electrical tone signal.

Figure 4C:
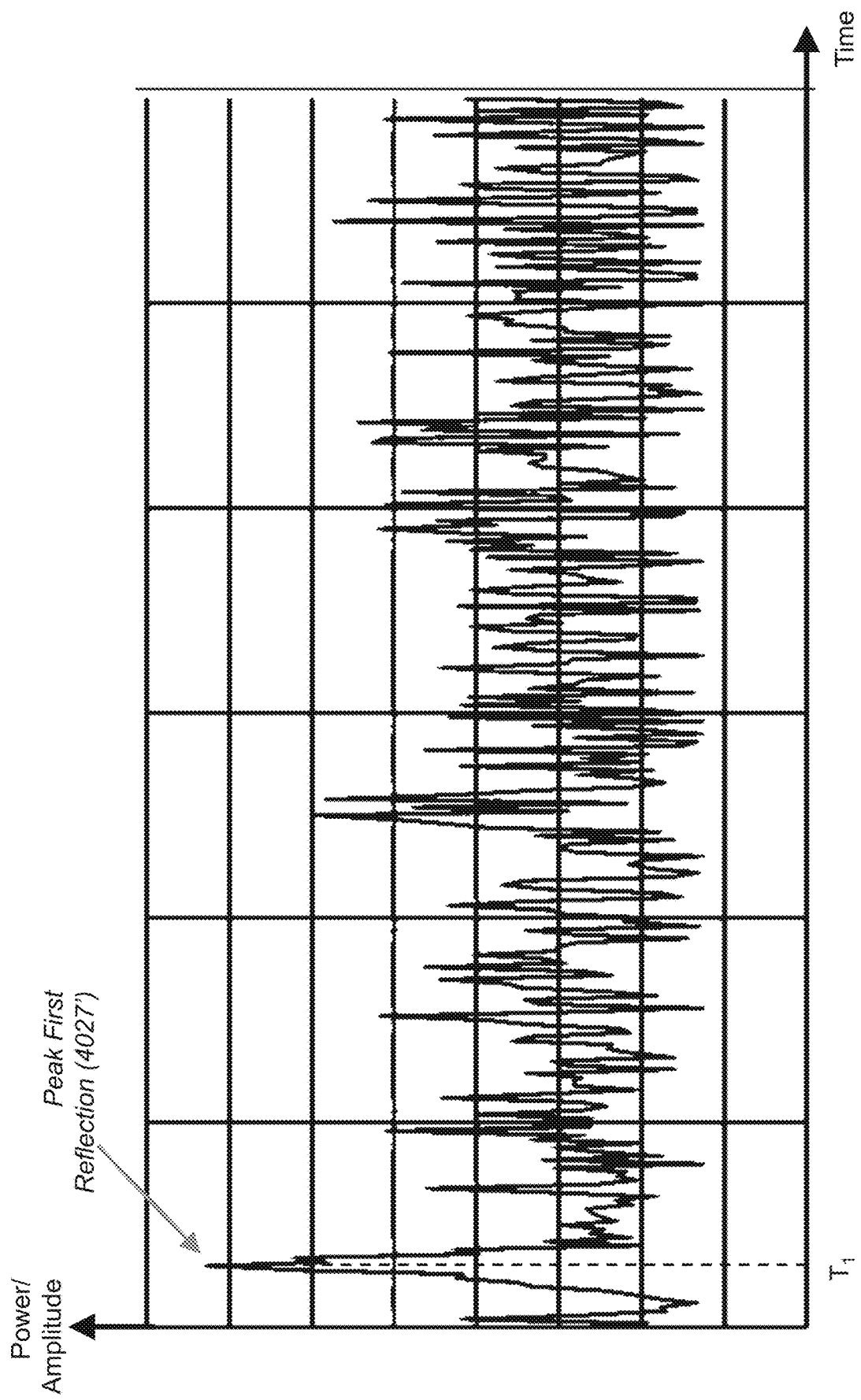
FIG. 4C shows an exemplary graph representing reflected optical pulses obtained during a measurement cycle via the OTDR of FIG. 4A.

FIG. 4C shows an exemplary graph representing reflected optical (light) pulses obtained during a measurement cycle via the OTDR of FIG. 4A or FIG. 4B. It should be noted that such graph is for discussion purposes only and represents real OTDR measurement of a fiber optic link similar to one described with reference to FIG. 1D measured at the transmit side TX1' of the communication module (222). In particular, coupling between the optical fibers OF1 and OF3 via the connector coupling (145) and coupling of the optical fibers OF1 and OF3 to the respective ports (1221) and (1218) have been manipulated to introduce discontinuities in an optical signal path of the fiber optic link. Accordingly, one would expect reflected peaks at positions in time that correspond to a time of flight of the transmitted OTDR signal (412) as reflected at each of the introduced discontinuities in the optical signal path. In particular, the graph of FIG. 4C shows raw data captured during the OTDR measurement cycle which can be seen as comprising noise that may bury the reflected peaks, at the exception of a peak first reflection (4027') at a time $T_1$ that corresponds to a discontinuity introduced at a coupling between the transmitter TX1' and the optical fiber OF1 shown in FIG. 1D.

As shown in FIG. 4C, the reflected signal may contain substantial noise, preventing associating a unique signature to the fiber optic link based on detected levels of light. In other words, even in the absence of any changes to the fiber optic link, a unique signature to the link cannot be provided due to the high levels of noise (e.g., back to back measurements may provide different signatures). Accordingly, the captured raw data may be stored and processed, for example, via averaging or other well-known filtering and signal processing techniques, to obtain, based on a first level of processing, the graph of FIG. 4D, and based on a second level of processing, the graph of FIG. 4E. Such processing of the captured raw data may allow robust detection of a signature of the fiber optic link, inclusive of any discontinuities in the optical fiber, despite possible high levels of noise in the captured raw data. Depending on the fiber optic link, one or more methods of digital signal processing may be used on the captured raw data to generate the unique signature. As will be described later, such signature may be compared to predefined parametric signature values for link health assessment.

Figure 4D:
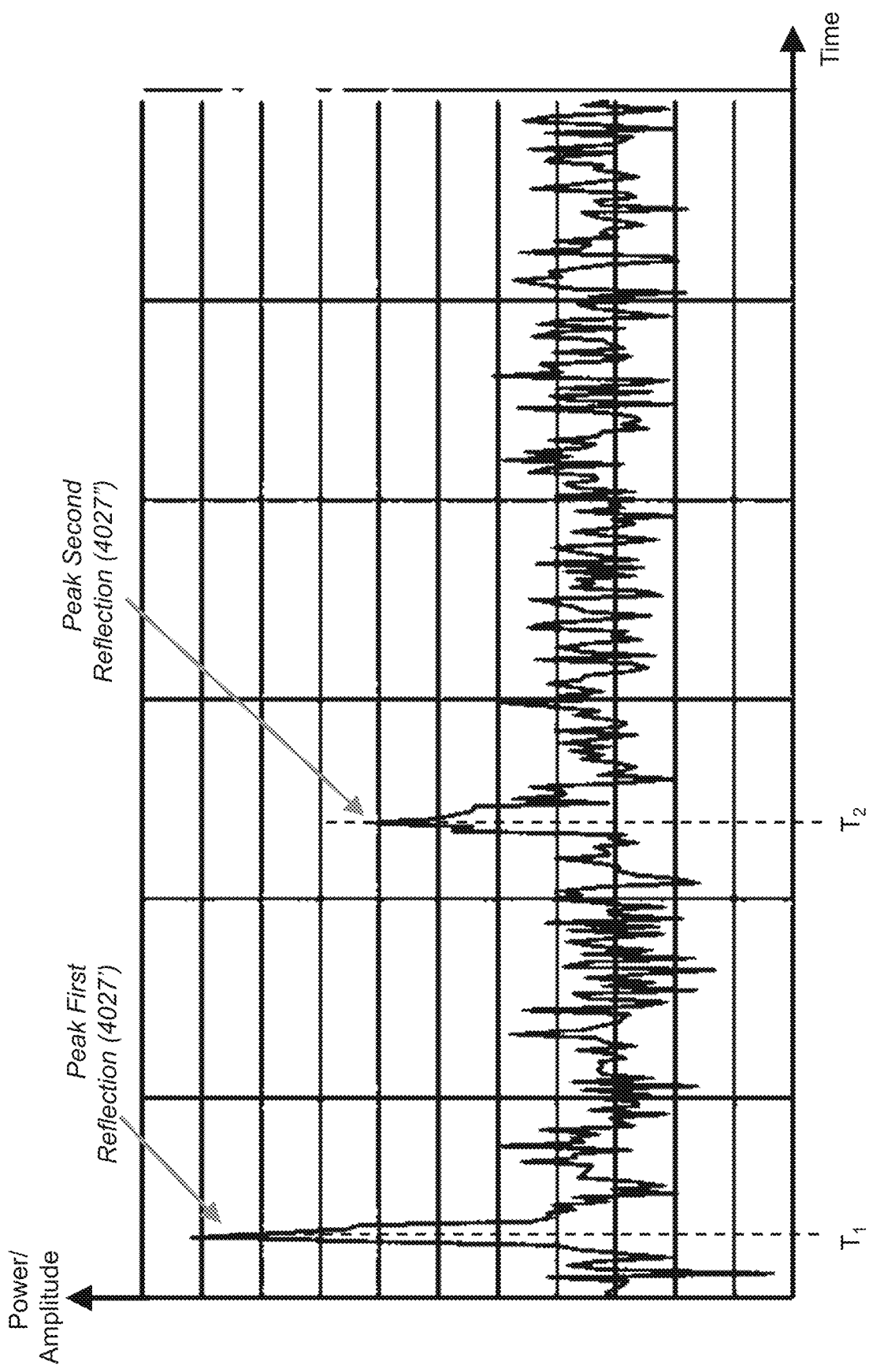
FIG. 4D shows a graph representing data obtained by processing data represented in FIG. 4C.

With reference to FIG. 4D, the first level of processing detects a peak second reflection (4027") at time $T_2$ that may correspond to a discontinuity introduced at the connector coupling (145) between the optical fiber OF1 and the optical fiber OF2 shown in FIG. 1D. Furthermore, as can be seen in FIG. 4E, the second level of processing detects a peak third reflection (4027''') at time $T_3$ that may correspond to a discontinuity introduced at a coupling between the receiver RX1 and optical fiber OF3 shown in FIG. 1D.

Teachings according to the present disclosure use such raw data captured during an OTDR measurement cycle to assess/measure any changes to a fiber optic link. The raw data, or processed versions thereof, can be used to define a present (unique) signature of the fiber optic link which can be compared to (predefined) parametric signature values for link health assessment. According to some embodiments of the present disclosure, as shown in FIG. 4E, such raw data (and/or corresponding processed data) can be divided according (e.g., mapped) to contiguous time intervals (e.g., Interval 1, . . . , Interval 6 of FIG. 4E) each describing a physical portion (physical length interval, for example few millimeters or more in length) of the fiber optic link. Each such contiguous time interval may be described by one or more scalar values derived from the raw data, such as, for example, a maximum value, a minimum value, a root mean square (rms) value, an average value, an average rms value, an integrated value, a range value, or other mathematically derived values that can be used to describe a reflected signal amplitude value and/or range corresponding to each portion of the fiber optic link. Scalar values associated to each interval may be considered as a (present) signature of the fiber optic link and may be compared to a parametric signature value representing a predefined healthy state of the fiber optic link. For example, with reference to FIG. 4E, according to a non-limiting embodiment of the present disclosure, description/signature of: Interval 1 may include a maximum value greater than 5; of Interval 2 may include a maximum value smaller than 3; of Interval 3 may include a maximum value greater than 4; of Interval 4 may include a maximum value smaller than 3; of Interval 5 may include a maximum value greater than 3; and of Interval 6 may include a maximum value smaller than 3. It should be noted that length of the intervals described in FIG. 4E are purely for the sake of discussion and not intended to limit the present teachings. As shown in FIG. 4F, such lengths may be different.

As shown in FIG. 4F, data captured during an OTDR measurement cycle may be divided according to contiguous time intervals (e.g., I1, I2, . . . , I11) that are not necessarily equal in length. As shown in FIG. 4F, time intervals (I9, I10, I11) are different in length than time intervals (I1, . . . , I8). Such difference in time intervals may be based on different measurement requirements in view of, for example, different types of components of the fiber optic links or a priori known design differences of the fiber optic links. Furthermore, captured data corresponding to some time intervals may not be considered in the link health assessment according to the present teachings and therefore may not be associated with any scalar values as described above. For example, FIG. 4F shows discarded time intervals (labeled in the figure as Discard) whose data may not be considered in the link health assessment. It should be clear to a person skilled in the art that based on the FIGS. 4E and 4F, data intervals considered in the link health assessment according to the present teachings may be of same or different lengths and may represent entire physical length of fiber optic link or one or more segments of the fiber optic link. For example, FIG. 4F shows three different segments, (I1, I2, I3, I4), (I5, I6, I7, I8) and (I9, I10, I11), that are considered in link health assessment, such segments being separated by discarded segments that are not considered.

Figure 4E:
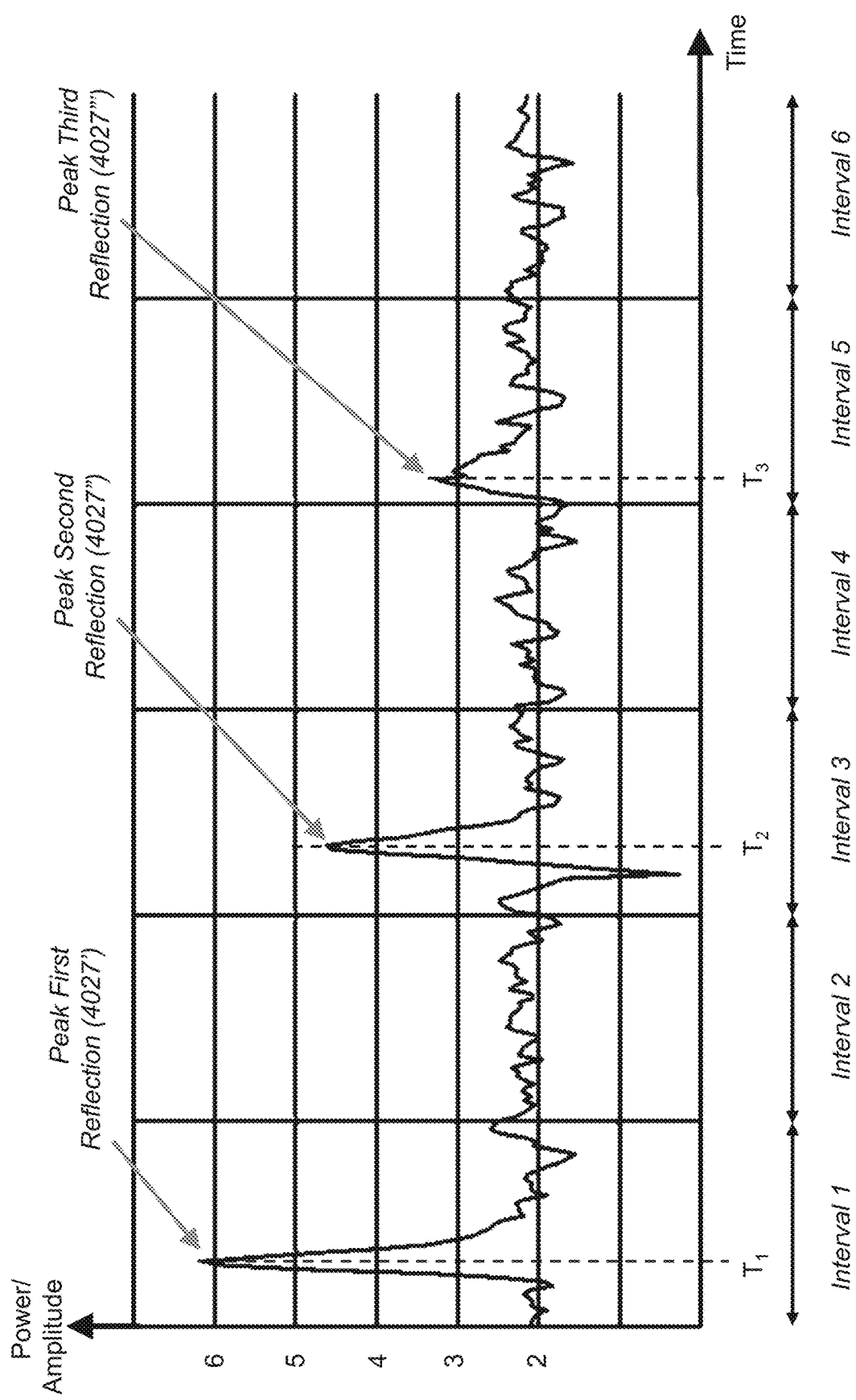
FIG. 4E shows a graph representing data obtained by further processing data represented in FIG. 4D and dividing such data according to different intervals.
Figure 4F:
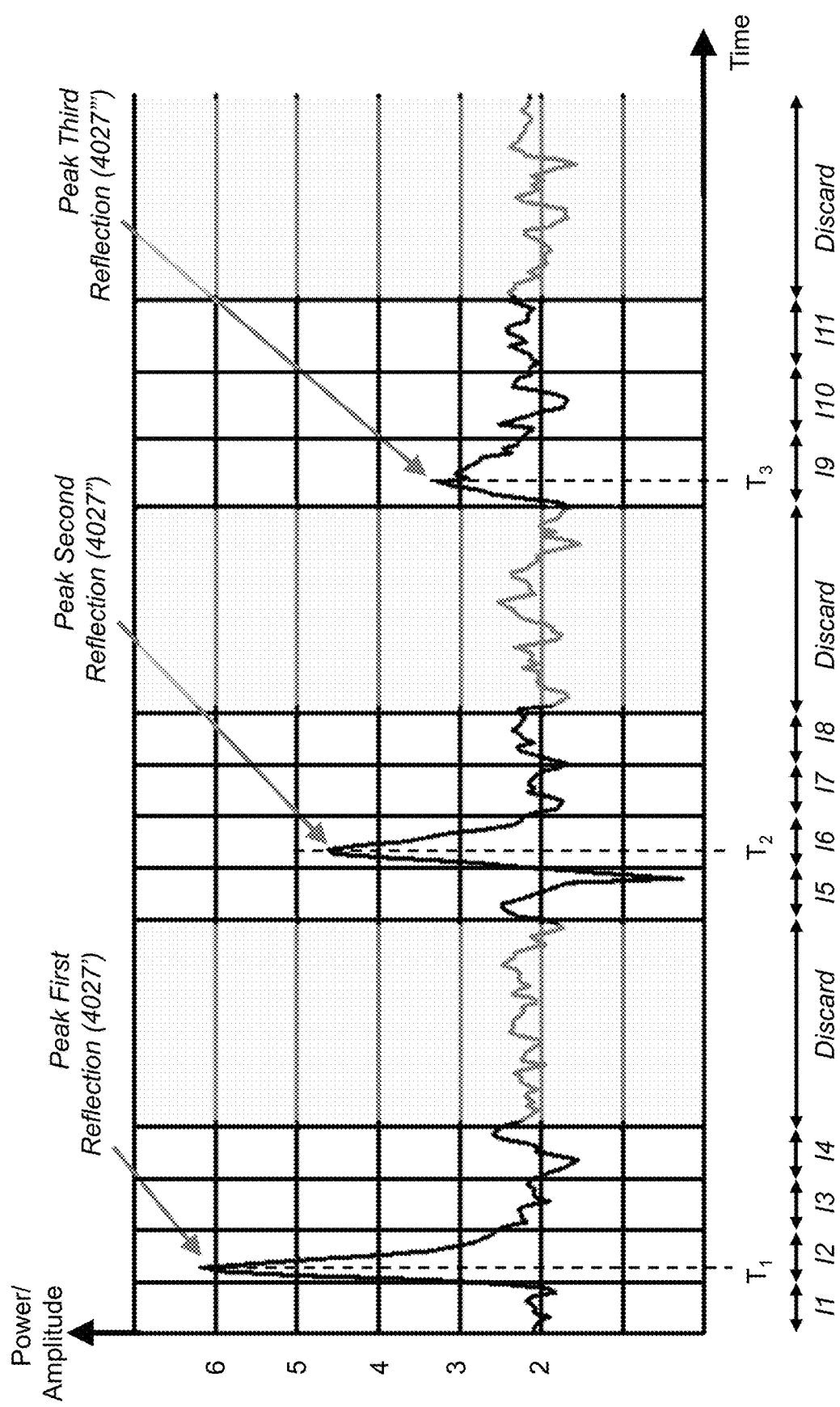
FIG. 4F shows a graph representing data obtained by further processing data represented in FIG. 4D and dividing such data according to different intervals of different lengths.

With continued reference to FIG. 4E and FIG. 4F, according to further embodiments of the present disclosure, (scalar) values of reflected light (reflection) associated to (describing) the contiguous time intervals (e.g., Interval 1, . . . , Interval 6, etc.) of each fiber optic link obtained during operating conditions of the fiber optic network can be compared to corresponding values obtained and stored during an initial condition of the fiber optic link, and/or to predetermined values/ranges/limits (of the reflections) based on a priori known design parameters of the fiber optic links. The result of the comparison can be used to quickly assess a change in any of the fiber optic links caused by, for example, a fault in a link or tampering of the link.

Teachings according to the present disclosure allow detection of problems or changes in the fiber optic network (e.g., FIG. 1A) based on the known initial condition of the network (e.g., of its fiber optic links) and known/expected variation tolerances of measurable parameters in the network (e.g., per time intervals of FIGS. 4E and 4F). The initial condition may be based on a predefined design of the network and/or a signature of the network that is based on an initial mapping (data measurement) of the network. Such initial condition may in turn be used to define parametric signature values for each interval shown in FIGS. 4E and 4F, thereby setting an allowed signature value that might indicate normal and acceptable functionality (healthy state) in a physical portion (i.e., location) of the link defined by the interval. The parametric signature values can be of various types, including min/max values, rms values, average values, average rms values, or other predefined parameters. The health assessment according to the present teachings uses the parametric signature values to automatically detects a (physical) location of a problem or a change of the fiber optic network. Resolution of such detection can be down to a portion of a fiber optic link as defined, for example, by any of the intervals shown in FIGS. 4E and 4F. A person skilled in the art would clearly appreciate that pinpointing a physical location of the problem can help to expedite fixing of the problem.

FIG. 5A shows a simplified block diagram (500A) according to an exemplary embodiment of the present disclosure of a network component (121) of the fiber optic network (100) of FIG. 1A, such as the network component of FIGS. 2A and 2B, comprising an integrated OTDR (502) such as, for example, the OTDR (402B) of FIG. 4B. As shown in the exemplary configuration of FIG. 5A, the OTDR (502) may be selectively coupled to a transmit side (TX1) of a fiber optic link (e.g., 1218_1221 of FIGS. 1B-1C) of the communication system (100). In the exemplary configuration depicted in FIG. 5A, an optical switch element (555) may be used to selectively couple a reference light pulse (416) from the OTDR (502B) and an output light signal from a transmit channel of the communication module (221) to a fiber optic used in a corresponding fiber optic link (e.g., OF1 or OF2 used in the fiber optic link 1218_1221 shown in FIGS. 1B-1C). A person skilled in the art will know of many exemplary implementations of the optical switch element (555), which may include, for example, optical lenses/mirrors, beam combiner, or beam splitters. It should be noted that in view of typical usage of semiconductor-based light elements (e.g., laser diodes) as light sources in the transmitter of a communication module as well as in the OTDR (502), switching of the light via direct control of such light elements may also be provided, in combination with other optical elements to provide functionality of the optical switch element (555).

With continued reference to FIG. 5A, according to an exemplary embodiment of the present disclosure, start of an OTDR measurement cycle may be triggered by the controller (250), under for example, a request/command issued through the connection (255), which in turn may prompt the OTDR (502) to switch state of the switch (555) (e.g., via a control flag Ctrl) and couple the reference light pulse (416) to the fiber optic. Alternatively, or additionally, a local controller to the communication module or to the OTDR (502) may start an OTDR measurement cycle and store corresponding measurement in local memory for later reporting. It should be noted that although the configuration depicted in FIG. 5A shows a single OTDR (502) that can be multiplexed amongst various fiber optic links provided by communication channels (2211, . . . , 221n) of the network element (121), according to other exemplary embodiments of the present disclosure, more than one OTDR (502) can be used, so that, for example, each port (2211, . . . , 221n) comprises a respective OTDR (502). Such one-to-one configuration between a communication channel and a corresponding OTDR (410) may be used, for example, in configurations where the communication modules are external to the network element (121), such as, for example, described above with reference to FIGS. 2B and 2C. Such configurations may advantageously use transmitter modules with integrated OTDR as described above with reference to FIG. 4A and shown (e.g., item 400) in the simplified block diagram of FIG. 5B.

Figure 6A:
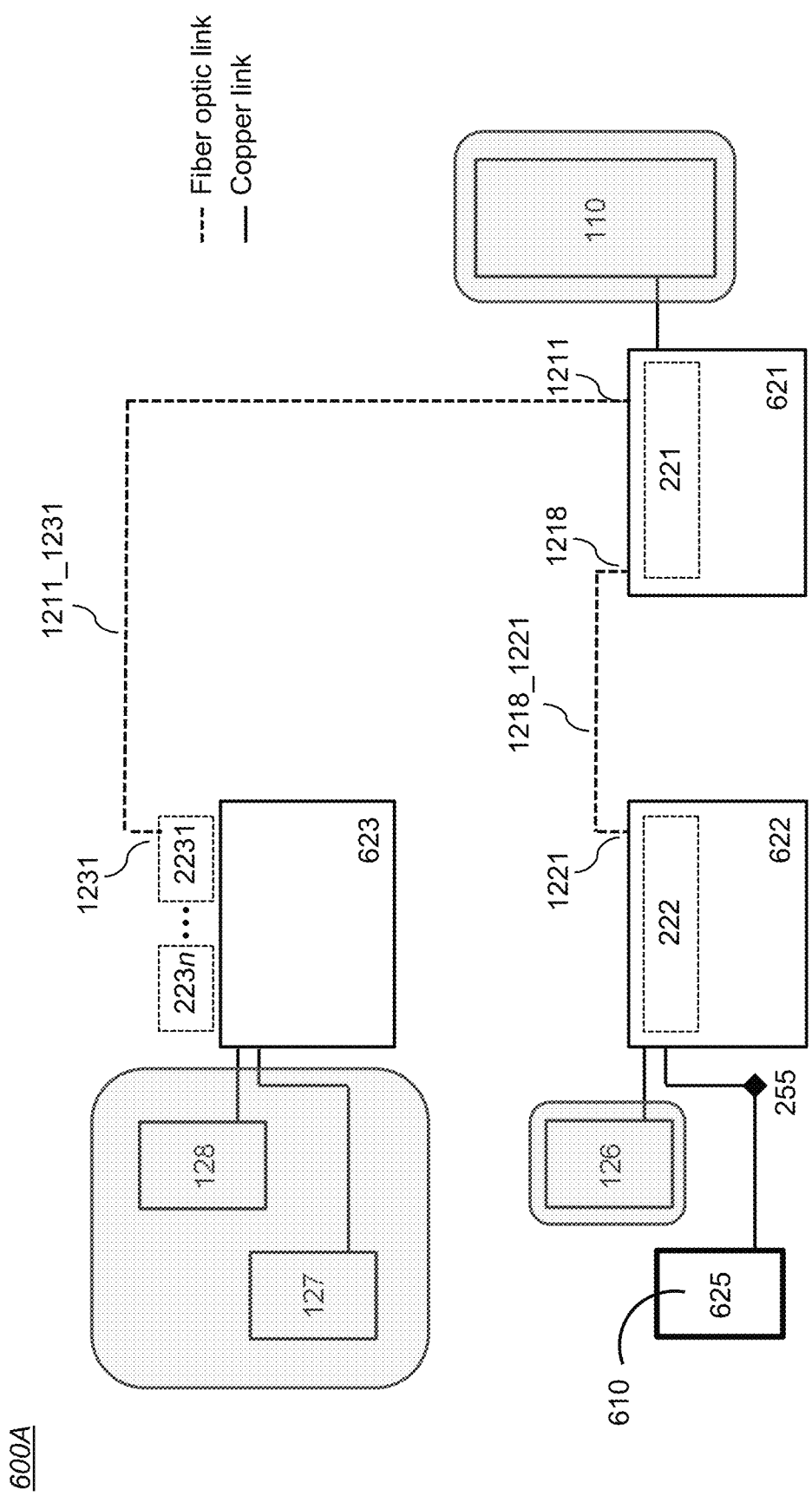
FIG. 6A shows an exemplary embodiment according to the present disclosure of a fiber optic network comprising an automated system for link health assessment (ASLHA).

FIG. 6A shows an exemplary embodiment according to the present disclosure of a fiber optic network (600A) comprising an automated system for link health assessment (ASLHA) of the fiber optic network (600A). The exemplary fiber optic network (600A) is shown to have a topology (ports and links) similar to the network (100) of FIG. 1A, with the difference that network components (621, 622, 623) may include features described above to provide telemetry data and/or OTDR measurement data for each of the fiber optic links of the network (e.g., 1218_1221, 1211_1231, etc.). In particular, according to an exemplary embodiment of the present disclosure, a (computer-based station) workstation (e.g., 625) coupled to a port (e.g., a connection 255) of the fiber optic network (600A), may comprise ASLHA functionality (610) to initiate and/or read telemetry data and/or OTDR measurement data for each fiber optic link of the network (600A). As will be described later in the present disclosure, such ASLHA functionality may include executable functions/routines to perform tasks related to the link health assessment according to the present teachings.

Figure 6B:
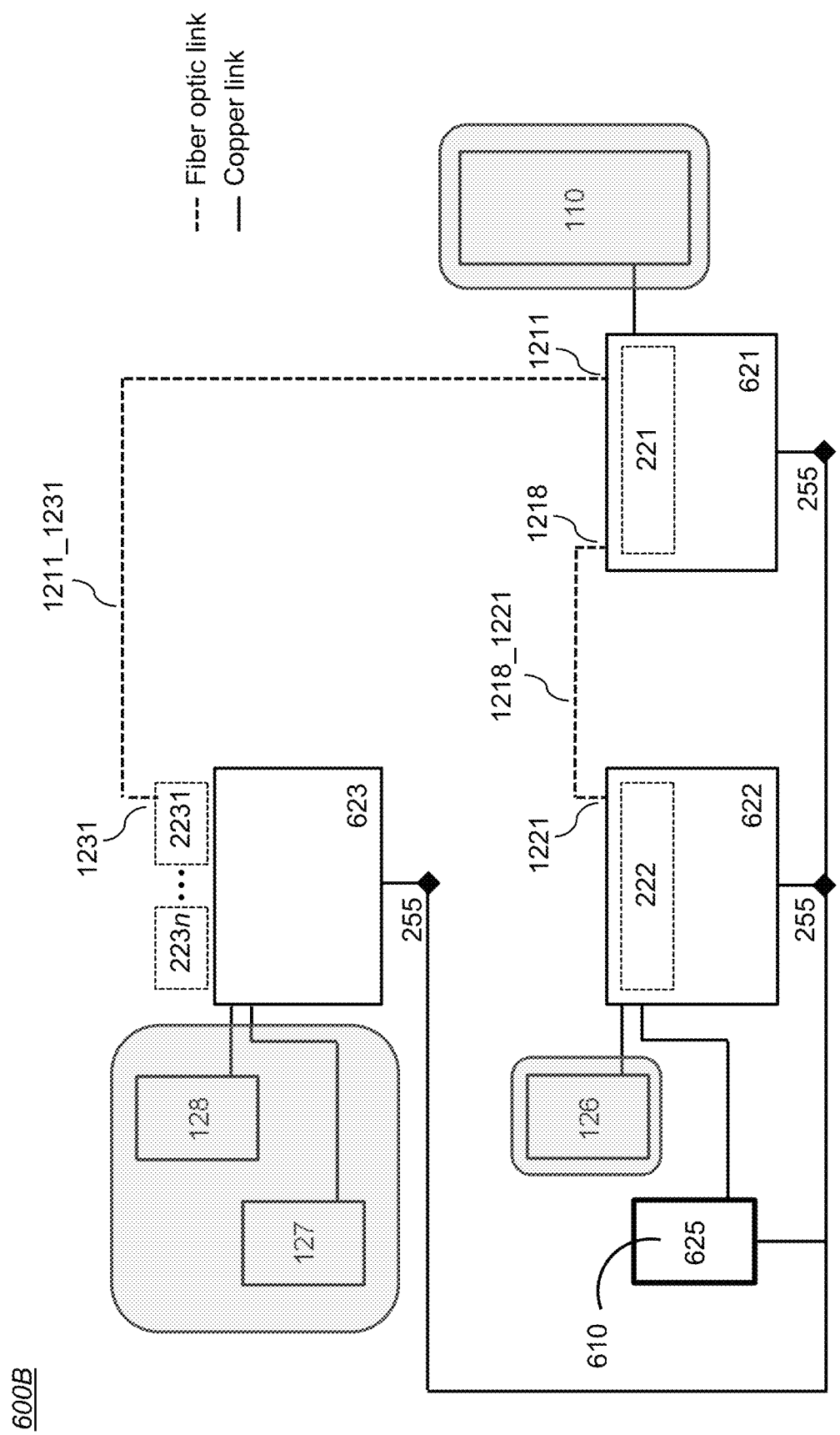
FIG. 6B shows another exemplary embodiment according to the present disclosure of a fiber optic network comprising an automated system for link health assessment (ASLHA).

In the non-limiting exemplary case shown in FIG. 6A, it is assumed that the workstation (625) can have access to the telemetry and/or OTDR measurement data via network links (e.g. network ports). FIG. 6B shows an alternative configuration according to yet another exemplary embodiment of the present disclosure, wherein the workstation (625) accesses the telemetry and/or OTDR measurement data for each of the fiber optic links of the network via respective connections (255) to the network components (e.g., 621, 622, 623, etc.) that may not be ports of the network. A person skilled in the art would clearly understand that the ASLHA functionality (610) of the fiber optic network (e.g., 600A, 600B of FIGS. 6A, 6B) according to the present teachings is not limited to any specific workstation (625) or type of connection of the workstation (625) to the network, rather to the availability of the telemetry and/or OTDR measurement data for each fiber optic link of the network and the accessibility of such data from a central port (e.g., connection to a central station such as the workstation 625) where the ASLHA functionality (610) resides. Furthermore, it should be clear to a person skilled in the art that the workstation (625) may be any of the network components (e.g., 126-128, 625, 621-623, etc.) shown in FIG. 6A and FIG. 6B so long as it can support running routines/functions (e.g., per FIGS. 7-9 later described) associated to the ASLHA functionality (610).

With continued reference to the ASLHA functionality (610) included, for example, in the fiber optic networks (600A) and (600B) discussed above, such functionality may include access to a central database that can be used as a repository of data measurements, including telemetry and/or OTDR, collected from the network components (e.g., 621, . . . , 623, etc.), as well as additional data that may be used as reference data (e.g., min/max limits to be applied to data measurements based on an initial condition of the links and/or a priori known design parameters of the link) to assess health of the fiber optic network. Collection/generation of such data may be in view of a known or a priori established topology of the network, as described, for example, by various tables stored in the database. According to an exemplary non-limiting embodiment of the present disclosure, such tables may include, for example a communication table, a link table, and a segment table, which in combination provide the necessary information that allows the ASLHA functionality (610) to access telemetry and/or OTDR measurement data for each fiber optic link of the network, and compare such data with reference (baseline) data stored in the tables. It should be noted that the central database may be stored locally in the workstation (625) or stored remotely in a different workstation that is accessible to the workstation (625).

According to an embodiment of the present disclosure, the communication table may include identifiers (e.g., Communication_ID) to uniquely identify each communication module of the fiber optic network that may participate in any of the fiber optic links of the network. Such identifiers may include, for example, a network address of each communication module, or other identifiers, so to allow access to the communication module telemetry data (e.g., via a respective connection 255 described above) from the hardware (e.g., workstation 625) running the ASLHA functionality (610). A communication module name may be associated to each identifier to help a user locate the communication module within the fiber optic network.

According to an embodiment of the present disclosure, the link table may include identifiers to uniquely identify each pair of communication channels associated to (two ends of, ports of) a fiber optic link of the network. For example, with reference to the fiber optic link (1218_1221) shown in FIG. 1D, the link table may include a link_ID that may be descriptive to the user, and associated information on the two ports (1221) and (1218). Specifically, port (1221) can be identified by channel one (RX1', TX1') of the communication module (222), and port (1218) can be identified by channel one (RX1, TX1) of the communication module (221). Since access information to the communication modules (221, 222) is provided in the communication table, specific telemetry data of the communication channels associated to the fiber optic link (1218_1221) can also be accessed from the hardware (e.g., workstation 625) running the ASLHA functionality (610).

According to an embodiment of the present disclosure, the segment table may include information about the number of different optical fibers used in each fiber optic link of the network. For example, with reference to the fiber optic link (1218_1221) shown in FIG. 1D, the segment table may associate to a link_ID of the link table that describes the link from TX1' of the communication module (222) to RX1 of the communication module (221), two segments (e.g., associated to optical fibers OF1, OF3). On the other hand, the segment table may associate to a link_ID of the link table that describes the link from TX1 of the communication module (221) to RX1' of the communication module (221), a single segment (e.g., associated to optical fiber OF2). Furthermore, the segment table may associate to each segment of a link defined in the link table, reference values (e.g., min/max values, etc. that may be associated to the intervals described with reference to FIG. 4E) that may be used as reference for link health assessment based OTDR measurements of the link. For example, with reference to FIG. 1D and FIG. 4E, for the segments OF1 and OF3, the segment table may include average, minimum and maximum values for relative power at each of the time intervals (Interval 1, . . . , Interval 6).

Figure 7A:
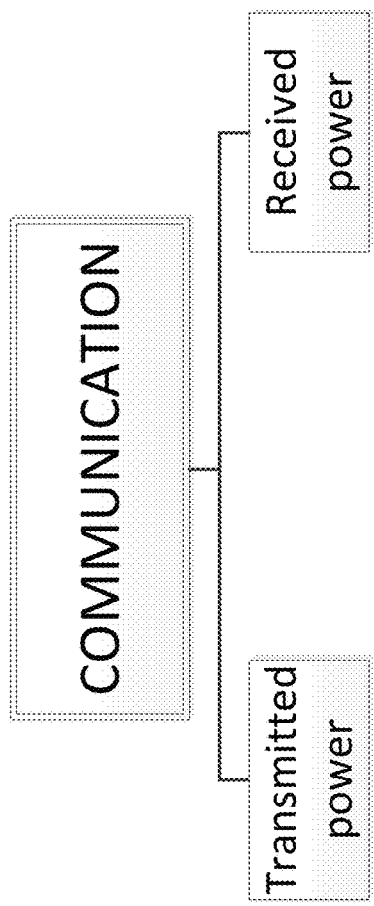
FIG. 7A shows exemplary function blocks of a Communication mode of operation of the ASLHA of FIGS. 6A-6B that reads available telemetry data.
Figure 7B:
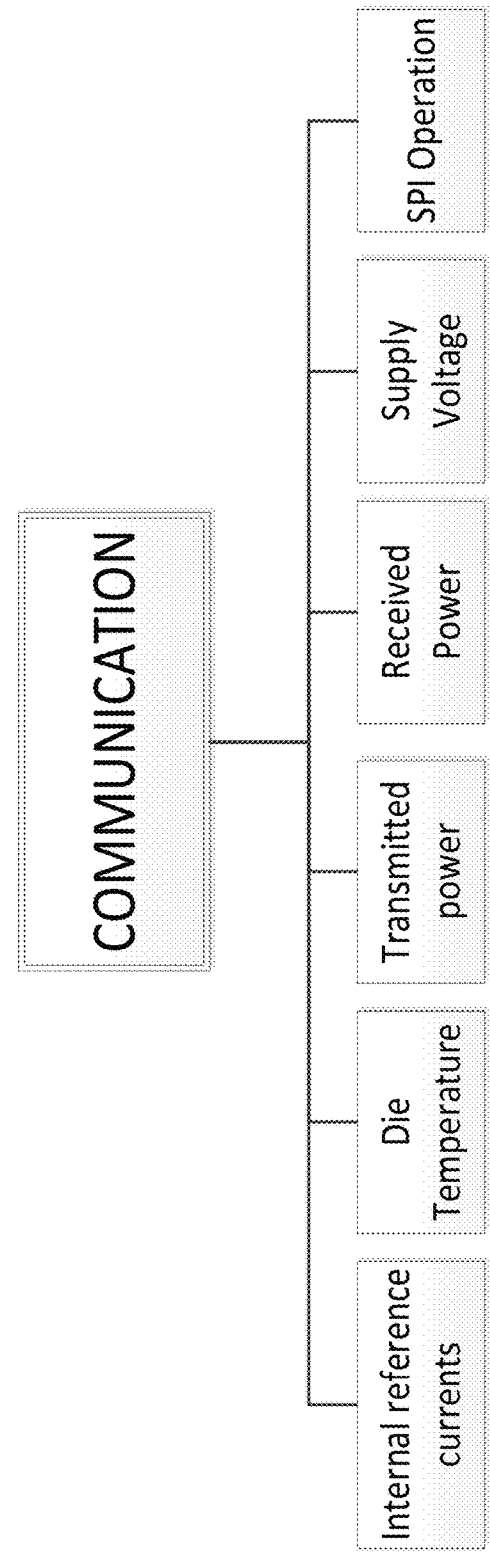
FIG. 7B shows exemplary function blocks of the Communication mode of operation of the ASLHA of FIGS. 6A-6B that reads additional available telemetry data.

FIGS. 7A-7B show exemplary function blocks of a Communication mode of operation of the ASLHA functionality (610) that may be used to read available telemetry data associated to communication modules and links defined in the associated communication table and link table. For example, when the ASLHA functionality (610) invokes the Communication mode of operation, telemetry data from any of communication modules and associated one or more channels of the network can be read into the workstation (625) via corresponding access information (e.g., address) stored in the database tables. As shown in FIGS. 7A and 7B, the Communication mode of operation may request different sets of telemetry parameter values, such as for example, transmitted and received powers in the case shown in FIG. 7A, and additional telemetry parameter values as shown in FIG. 7B.

Figure 8:
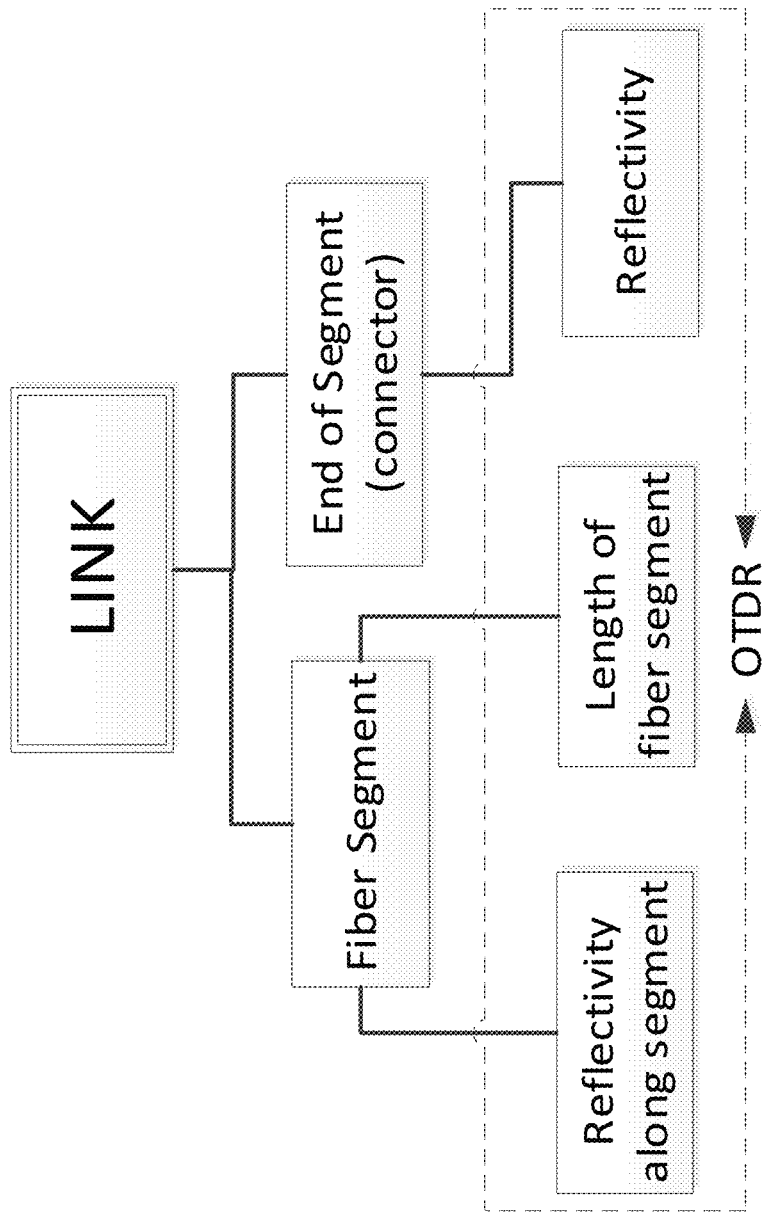
FIG. 8 shows exemplary function blocks of a Link mode of operation of the ASLHA of FIGS. 6A-6B that reads OTDR measurements from the integrated OTDR shown in FIGS. 5A-5B.

FIG. 8 shows exemplary function blocks of a Link mode of operation of the ASLHA functionality (610) that initiates and reads OTDR measurements associated to links defined in the associated communication table, link table and segment table. For example, the ASLHA functionality (610) may invoke the Link mode of operation for a specific link of the link table, such as for example the link defined by TX1' of communication module (222), OF1, OF3, and RX1 of the communication module (221) of FIG. 1D, which in turn may initiate an OTDR measurement cycle for the specific link, after which corresponding OTDR measurement data can be read into the workstation (625) via corresponding access information (e.g., address) stored in the database tables. As noted above with reference to FIG. 4E, corresponding OTDR measurement data may divided according to contiguous time intervals each describing a portion (physical interval, for example few millimeters or more in length) of the fiber optic link or a segment thereof.

Figure 9A:
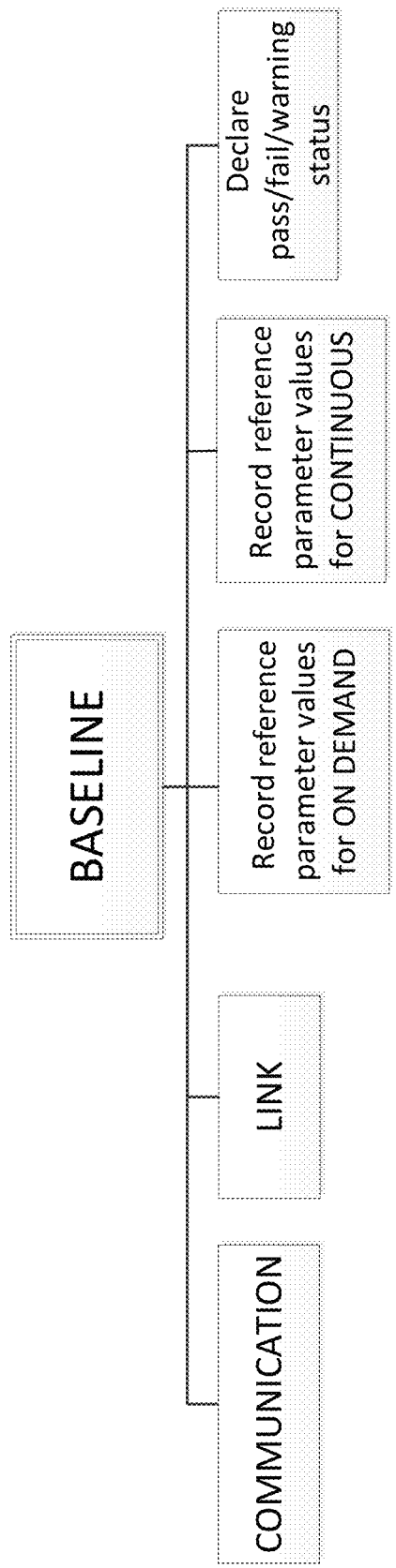
FIG. 9A shows exemplary function blocks of a Baseline mode of operation of the ASLHA of FIGS. 6A-6B that reads, and records, baseline parameter values of the fiber optic network based on the Communication and Link modes of operation.
Figure 9B:
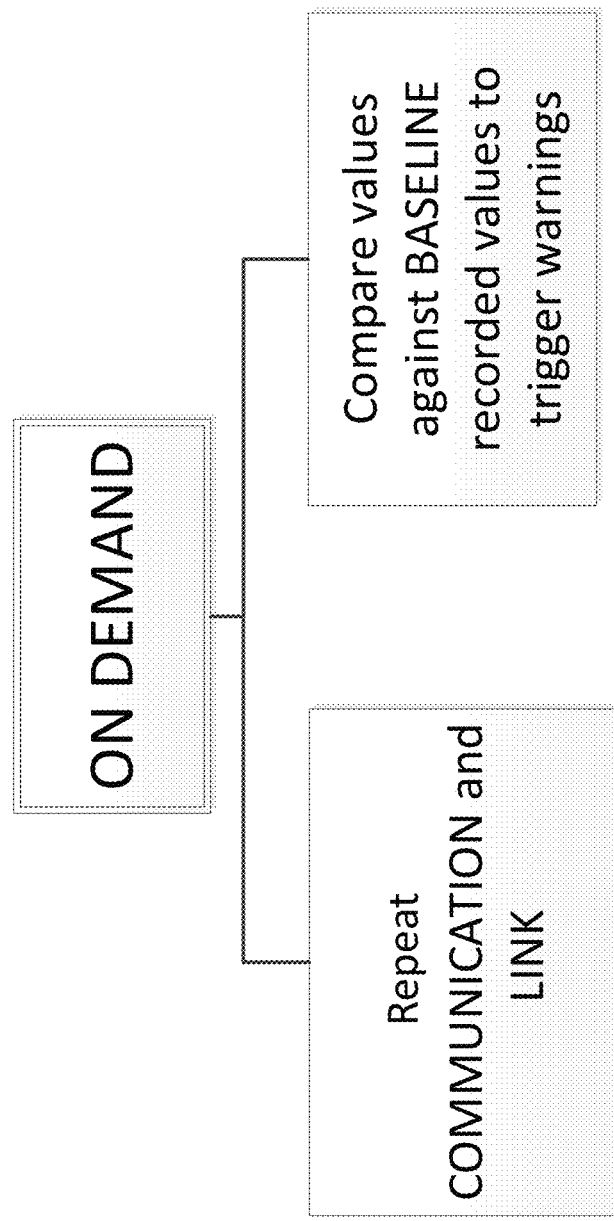
FIG. 9B shows exemplary function blocks of an On Demand mode of operation of the ASLHA of FIGS. 6A-6B that reads parameter values of the fiber optic network based on the Communication and Link modes of operation and compares the read parameter values to stored parameter values, such as, for example, the stored baseline parameter values.
Figure 9C:
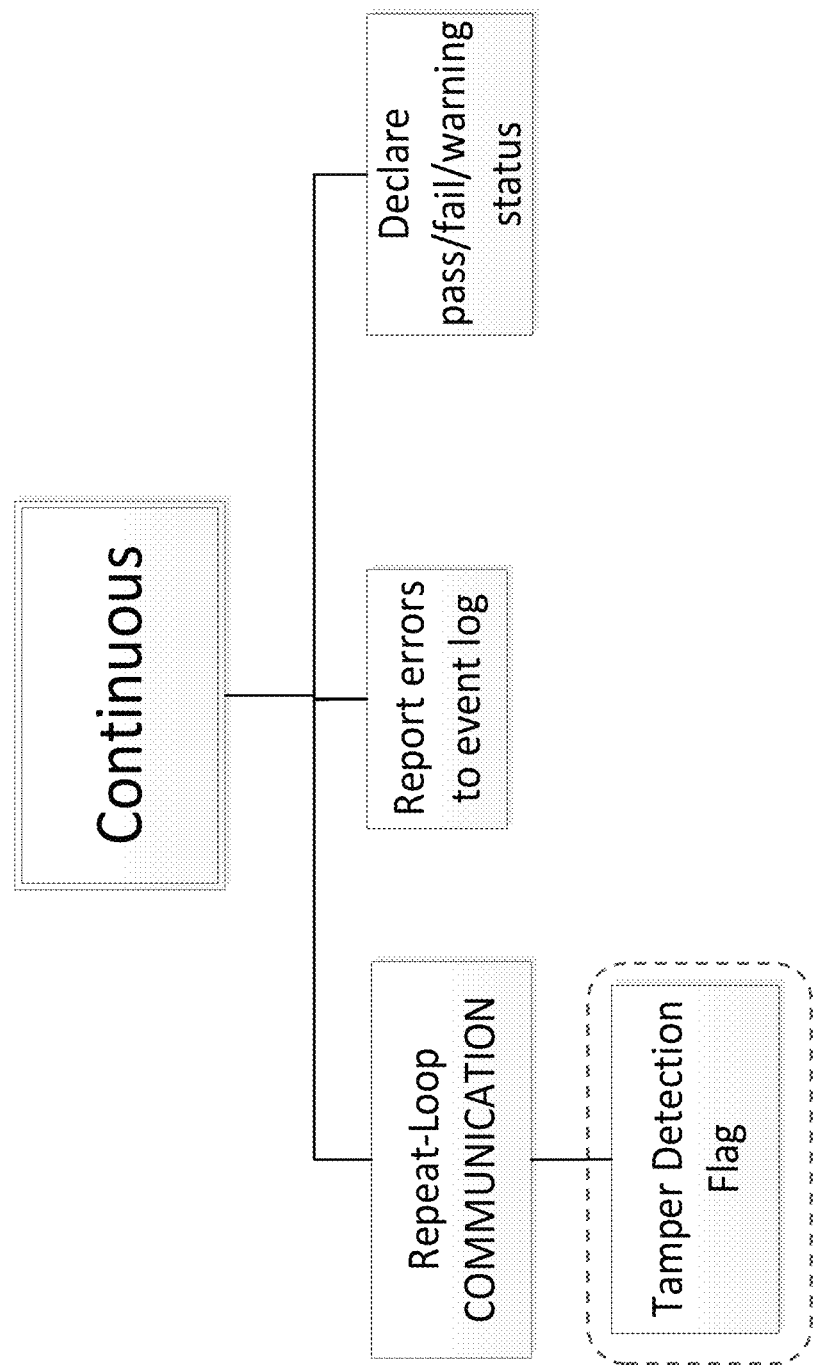
FIG. 9C shows exemplary function blocks of a Continuous mode of operation of the ASLHA of FIGS. 6A-6B that continuously reads, and records, parameter values of the fiber optic network based on the Communication mode of operation and optionally performs comparative tests of the read parameter values to detect a tampering of, or a change in, the fiber optic network.

The Communication mode of operation and the Link mode of operation described above may be used by higher level modes of operation of the ASLHA functionality (610) to perform automatic (e.g., continuous) or on demand (e.g., manually initiated) health monitoring tasks of the fiber optic network, such as, for example, a Baseline mode of operation per FIG. 9A, an On Demand mode of operation per FIG. 9B, and a Continuous mode of operation per FIG. 9C and FIG. 9D.

With reference to the Baseline mode of operation shown in FIG. 9A, such mode of operation may be used during, for example, an initial state of the fiber optic network where operation/health of the network is deemed acceptable for use as a reference (baseline) health state (e.g., network is healthy). In this case, the Baseline mode of operation may be used to take a reference snapshot (signature) of link related data that may be relevant to later use as reference data for assessing health of the network by way of, for example, comparison of the reference data with later captured effective data (e.g., per the On Demand mode of operation later described). As can be seen in FIG. 9A, the Baseline mode of operation may use the Communication mode of operation and the Link mode of operation to gather such reference data (e.g., telemetry and OTDR measurement data), and store/record the reference data into the database while associating the reference data to specific links. According to some exemplary embodiments, such reference data can be further categorized for use specifically by the On Demand mode of operation or the Continuous mode of operation. For example, according to an exemplary embodiment, the Continuous mode of operation may not include capturing of OTDR measurement data, and therefore reference data for the Continuous mode of operation may not include reference OTDR measurement data. According to a further embodiment of the present disclosure, the Baseline mode of operation may include status feedback that may prompt pass/fail/warning messages with respect to data captured via (calls to) the Communication and/or Link mode of operation in view of limits set, for example, by system design criteria, and stored in the database. This may allow to discard unacceptable data as reference data and prompt the operator/system administrator to fix a related hardware component prior to generating the reference data, or prior to using the On Demand or Continuous modes of operation.

With reference to the On Demand mode of operation shown in FIG. 9B, such mode of operation may be used after the reference data are generated via, for example, the Baseline mode of operation, and stored in the database. As shown in FIG. 9B, the On Demand mode of operation may capture new telemetry and/or OTDR measurement data via the Communication and/or the Link modes of operation and compare the captured data against the reference data. As will be appreciated by a person skilled in the art, such comparison may provide insight in any changes in the fiber optic links of the network represented by available telemetry and OTDR measurement parameters. This includes, for example, issues with an optical fiber segment (e.g., OF1, OF2, OF3 of FIG. 1D), whether a break in the fiber or a loose connector that may cause different values of reflected power at different positions (in time); issues with an aging communication channel as represented by, for example, a lower value of a transmitted power; or issues with dirty connections/fiber faces as represented by, for example, a lower value of a received power at a receive end of a link in view of a same value of a transmitted power at a transmit end of the link. As shown in FIG. 9B, result of comparison of the captured data with respect to the reference data may be recorded into the database and/or prompt warnings to a user. According to some exemplary embodiments, warnings may be displayed in the form of simple pass/fail (e.g., green/red) flags for each link in the database, with optional lower level comparison data available upon request.

With reference to the Continuous mode of operation shown in FIG. 9C, such mode of operation may be used after the reference data are generated via, for example, the Baseline mode of operation, and stored in the database. As shown in FIG. 9C, the Continuous mode of operation may include a loop that repeatedly captures new telemetry data via the Communication mode of operation. According to an exemplary embodiment of the present disclosure, captured data by the loop may be compared against the reference data and corresponding errors reported (e.g., to an event log file/table) and warnings displayed in a manner similar to the one described above with respect to the On Demand mode of operation. According to another exemplary embodiment of the present disclosure, captured data by the loop may be compared against itself to monitor any progressive changes/trends in the system which may optionally be compared against limits set by design requirements of the system.

According to an exemplary embodiment of the present disclosure, the Continuous mode of operation may (optionally) detect a tampering of a fiber optic link of the network and generate a corresponding flag as shown in FIG. 9C. The flag may be based on locally captured continuous telemetry data by the communication modules that can detect a small duration drop in a received power at the ends of the links. For example, as described above, the communication modules may include functionality to continuously, or at given pre-programmed time periods, monitor/capture the telemetry data and locally record (e.g., local memory) corresponding minimum, maximum, average, and other statistical values/trends which can be read by the loop of the Continuous mode of operation. A person skilled in the art would appreciate that telemetry data captured locally may include a higher resolution in detection of a change in a parameter value and therefore may be used as a good indicator of a transient change (e.g., quick swap/addition of a cable or a connector) in the network. In turn, the ASLHA functionality (610) may use a tampering detected flag to display system warning or any other desired action. Furthermore, although not shown in FIG. 9C, the Continuous mode of operation may invoke the Link mode of operation to perform OTDR measurements of links without affecting data traffic, which can be made possible via various OTDR or OFDR techniques described above with reference to FIG. 4A and FIG. 4B. According to some embodiments of the present disclosure, tamper detection may be based on continuous OTDR or OFDR measurements, or a combination of continuous OTDR or OFDR measurements with continuous telemetry data measurement. According to some embodiments of the present disclosure, a transient event detected via continuous telemetry data measurement described above may trigger an OTDR or OFDR measurement to further diagnose nature/location of the tampering.

With further reference to the tamper detection feature, according to an embodiment of the present disclosure, the locally captured telemetry data by the communication module may include a received power whose value is continuously monitored and compared to a locally stored reference value that may include a minimum and/or maximum value, or a reference range defined by a minimum and maximum value, and a flag is set by the communication module if the value of the received power is different from the reference value and/or outside the reference range. In turn, the ASLHA functionality (610) may periodically check a value of the flag to determine whether a tampering of the link was detected (a tamper event) since a last check. Once the ASLHA functionality (610) checked the flag, the flag may be reset either locally by the communication module or directly by the ASLHA functionality (610). Alternatively, or in addition, the communication module may locally store minimum and/or maximum values of the received power and the ASLHA functionality (610) may establish tamper detection based on such values and predetermined baseline values.

With further reference to the tamper detection feature, according to some embodiments of the present disclosure, detection of a tamper event by the ASLHA functionality (610) as described above may trigger start of the On Demand mode of operation (FIG. 9B) for detecting any possible changes in the network that may have been performed in view of the detected tampering. For example, the On Demand mode of operation may detect, based on the parametric signature values, a change in a signature of a fiber optic link associated to the communication module that has set a tamper detection flag. Accordingly, such change may be contributed to the tamper event rather than a fault.

Figure 10:
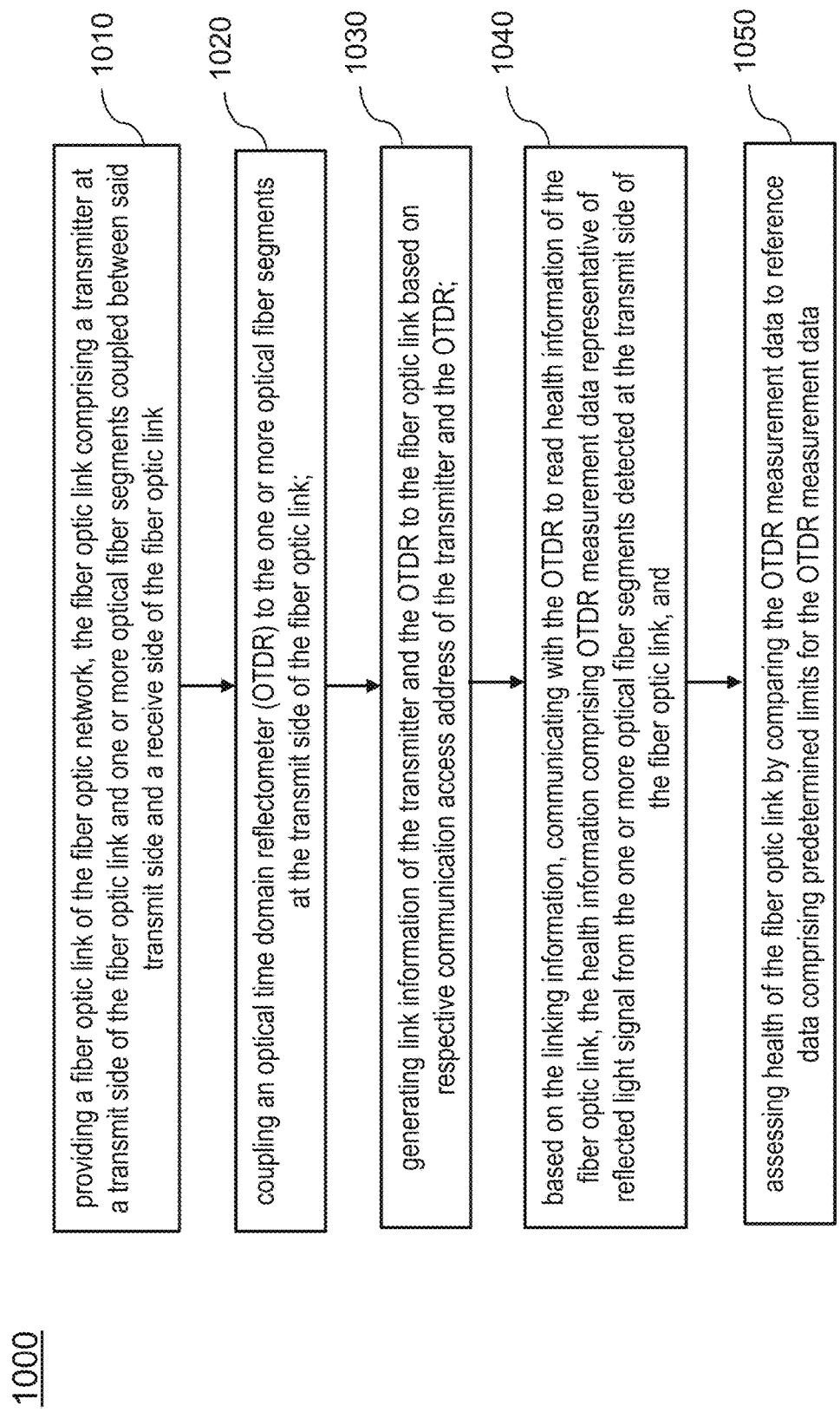
FIG. 10 is a process chart showing a method for an automated link health assessment of a fiber optic network according to an embodiment of the present disclosure.

FIG. 10 is a process chart (1000) showing various steps of a method for automated link health assessment of a fiber optic network. As can be seen in the process chart (1000), the method comprises: providing a fiber optic link of the fiber optic network, the fiber optic link comprising a transmitter at a transmit side of the fiber optic link and one or more optical fiber segments coupled between said transmit side and a receive side of the fiber optic link, per step (1010); coupling an optical time domain reflectometer (OTDR) to the one or more optical fiber segments at the transmit side of the fiber optic link, per step (1020), generating link information of the transmitter and the OTDR to the fiber optic link based on respective communication access address of the transmitter and the OTDR, per step (1030), based on the linking information, communicating with the OTDR to read health information of the fiber optic link, the health information comprising OTDR measurement data representative of reflected light signal from the one or more optical fiber segments detected at the transmit side of the fiber optic link, per step (1040), and assessing health of the fiber optic link by comparing the OTDR measurement data to reference data comprising predetermined limits for OTDR measurement data, per step (1050).

It should be noted that although some of the techniques described in the present disclosure for detecting a signature of a fiber optic link may rely on measurement of reflected light from an optical fiber used in the link, teachings according to the present disclosure may also apply to other techniques that can be used to provide information of behavior of a light signal through the optical fiber. For example, behavior of the light signal may be based on a measurement of the light signal at a receive side (RX1) of the fiber optic link showed in, for example, FIG. 1B in view of a known light signal at the transmit side (TX1') of the fiber optic link. In other words, a signature of the fiber optic link may be based on analysis of received light at the receive side (RX1) in view of transmitted light at the transmit side (TX1'). Such signature can then be used to compare against the parametric signature values method as described above.

Accordingly, in view of the above embodiments, methods and systems have been disclosed that enable automated health assessment of fiber optic links used in fiber optic communication systems.

It is understood that the specific order or hierarchy of steps in the processes disclosed is an example of applicable approaches. Based upon design preferences, the specific order or hierarchy of steps in the processes may be rearranged while remaining within the scope of the present disclosure. The accompanying method claims present elements of the various steps in a sample order and are not meant to be limited to the specific order or hierarchy presented.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium is coupled to the processor such that the processor can read information from, and write information to, the storage medium.

It will be understood that many additional changes in the details, materials, steps and arrangement of parts, which have been herein described and illustrated to explain the nature of the invention, may be made by those skilled in the art within the principle and scope of the invention as expressed in the appended claims.

The invention claimed is:

1. A communication module, comprising:
a transmitter for coupling at a transmit side of a fiber optic link, wherein the transmitter comprises sensors and circuitry configured to
continuously monitor transmitter telemetry data representative of internal or external operating conditions of the transmitter, and detect a transient event affecting one or more parameters represented by the transmitter telemetry data, the transient event defined by a maximum or a minimum value of the one or more parameters, and
communicate with a computer-based station to set a flag indicative of a health of the fiber optic link based on a comparison of the maximum or minimum value with corresponding predetermined limit values, the health represented by a tampering of, or a change in, the fiber optic link.

2. The communication module according to claim 1, wherein the transmitter telemetry data comprises one or more of: a) a local temperature; b) a minimum value of an operating supply voltage; c) a maximum value of the operating supply voltage; d) a transmit power; or e) a laser diode voltage.

3. The communication module according to claim 1, wherein the predetermined limit values are based on a priori known design parameters of the fiber optic link.

4. The communication module according to claim 1, wherein the predetermined limit values are locally stored in the transmitter.

5. The communication module according to claim 1, wherein the transmitter is further configured to communicate with the computer-based station to read the predetermined limit values.

6. The communication module according to claim 1, wherein the transmitter is further configured to compare the maximum or minimum value with the corresponding predetermined limit values to set a local flag indicative of the health of the fiber optic link.

7. The communication module according to claim 6, wherein the transmitter is further configured to communicate with the computer-based station to transmit the local flag.

8. The communication module according to claim 1, further comprising:
an optical time domain reflectometer (OTDR) for coupling to the transmit side of the fiber optic link, the OTDR configured to generate OTDR measurement data representative of reflected light signal detected at the transmit side of the fiber optic link.

9. The communication module according to claim 8, wherein the OTDR is further configured to communicate with the computer-based station to transmit the OTDR measurement data.

10. The communication module according to claim 8, wherein the OTDR is integrated with the transmitter such as to share a same optical coupler structure for coupling to the transmit side of the fiber optic link.

11. The communication module according to claim 8, wherein the OTDR is configured for selective coupling to the transmit side of the fiber optic link.

12. The communication module according to claim 8, wherein
the communication module comprises an additional transmitter for coupling at a transmit side of an additional fiber optic link, and
the OTDR is further configured for selective coupling to the transmit side of the additional fiber optic link.

13. The communication module according to claim 1, further comprising:
a receiver for coupling at a receive side of a fiber optic link.

14. The communication module according to claim 13, wherein:
the transmitter and receiver couple to a same side of the fiber optic link for bidirectional data communication.

15. The communication module according to claim 13, wherein the receiver comprises sensors and circuitry configured to
continuously monitor receiver telemetry data representative of internal or external operating conditions of the receiver, and detect a receiver transient event affecting one or more receiver parameters represented by the receiver telemetry data, the transient event defined by a maximum or a minimum value of the one or more receiver parameters, and
communicate with a computer-based station to set a receiver flag indicative of a health of the fiber optic link based on a comparison of the maximum or minimum value of the one more receiver parameters with corresponding predetermined limit values, the health represented by a tampering of, or a change in, the fiber optic link.

16. The communication module according to claim 15, wherein the receiver telemetry data comprises a receiver power representative of optical power of a light signal received at the receive side of the fiber optic link.

17. The communication module according to claim 15, wherein the predetermined limit values corresponding to the maximum or minimum value of the one more receiver parameters are locally stored in the receiver.

18. The communication module according to claim 15, wherein the receiver is further configured to communicate with the computer-based station to read the predetermined limit values corresponding to the maximum or minimum value of the one more receiver parameters.

19. A network component for communication over fiber optic links, the network component comprising a communication module according to claim 1.

20. The network component according to claim 19, wherein the communication module is a pluggable module of the network component.

21. The network component according to claim 19, wherein the communication module is integrated with the network component.

22. The network component according to claim 19, wherein:
the communication module further comprises a micro-controller or processor, and
the transmitter of the communication module is configured to communicate with the computer-based station via the micro-controller or processor.

23. A communication module, comprising:
a receiver for coupling at a receive side of a fiber optic link, wherein the receiver comprises sensors and circuitry configured to
continuously monitor receiver telemetry data representative of internal or external operating conditions of the receiver, and detect a transient event affecting one or more parameters represented by the receiver telemetry data, the transient event defined by a maximum or a minimum value of the one or more parameters, and
communicate with a computer-based station to set a flag indicative of a health of the fiber optic link based on a comparison of the maximum or minimum value with corresponding predetermined limit values, the health represented by a tampering of, or a change in, the fiber optic link.

24. The communication module according to claim 23, wherein the predetermined limit values are based on a priori known design parameters of the fiber optic link.

25. The communication module according to claim 23, wherein the predetermined limit values are locally stored in the transmitter.

26. The communication module according to claim 23, wherein the receiver is further configured to communicate with the computer-based station to read the predetermined limit values.

27. The communication module according to claim 23, wherein the receiver is further configured to compare the maximum or minimum value with the corresponding predetermined limit values to set a local flag indicative of the health of the fiber optic link.

28. The communication module according to claim 27, wherein the receiver is further configured to communicate with the computer-based station to transmit the local flag.

\* \* \* \* \*